(12) United States Patent
Dubey et al.

(10) Patent No.: US 10,374,904 B2
(45) Date of Patent: Aug. 6, 2019

(54) DIAGNOSTIC NETWORK VISUALIZATION

(71) Applicant: Cisco Technology, Inc., San Jose, CA (US)

(72) Inventors: Anubha Dubey, Sunnyvale, CA (US); Simon Day, San Jose, CA (US); Peter Phinney, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 207 days.

(21) Appl. No.: 14/714,047

(22) Filed: May 15, 2015

(65) Prior Publication Data

US 2016/0337204 A1 Nov. 17, 2016

(51) Int. Cl.
*H04L 12/24* (2006.01)
*G06F 3/0481* (2013.01)
(Continued)

(52) U.S. Cl.
CPC .............. *H04L 41/22* (2013.01); *G06F 3/048* (2013.01); *G06F 3/0484* (2013.01);
(Continued)

(58) Field of Classification Search
CPC .......... H04L 41/22; H04L 41/12; G06F 3/048
See application file for complete search history.

(56) References Cited

U.S. PATENT DOCUMENTS

| | | |
|---|---|---|
| 5,086,385 A | 2/1992 | Launey et al. |
| 5,319,754 A | 6/1994 | Meinecke et al. |

(Continued)

FOREIGN PATENT DOCUMENTS

| | | |
|---|---|---|
| CN | 101093452 | 12/2007 |
| CN | 101770551 | 7/2010 |

(Continued)

OTHER PUBLICATIONS

Cisco Technology, Inc., "Cisco IOS Software Release 12.4T Features and Hardware Support," http://www.cisco.com/c/en/us/products/collateral/ios-nx-os-software/ios-software-releases-12-4-t/product_bulletin_c25-409474.html; Feb. 2009.

(Continued)

*Primary Examiner* — Jeong S Park

(57) ABSTRACT

Systems, methods, and computer-readable media for network visualization. A system analyzes traffic associated with network elements and generates a graphical user interface (GUI). The GUI can include graphical segments representing the network elements and contiguously arranged in a first graphical structure. Each of the graphical segments can represent a category of network elements and indicate a number of network elements in the category. The GUI can also include a second set of graphical segments representing the network traffic and contiguously arranged in a second graphical structure. Each of the second set of graphical segments can represent a type of traffic associated with respective network elements and indicate an amount of traffic associated with the type of traffic. Moreover, the GUI can include visual indication(s) representing respective amounts of traffic for each specific type of traffic and/or an amount of bandwidth between the collector engine and a remote destination.

20 Claims, 19 Drawing Sheets

(51) Int. Cl.
  *G06F 3/048* (2013.01)
  *G06F 3/0484* (2013.01)
  *H04L 12/26* (2006.01)

(52) U.S. Cl.
  CPC ...... *G06F 3/04817* (2013.01); *G06F 3/04847* (2013.01); *H04L 43/045* (2013.01); *H04L 41/12* (2013.01)

(56) References Cited

U.S. PATENT DOCUMENTS

| | | | |
|---|---|---|---|
| 5,400,246 A | 3/1995 | Wilson et al. | |
| 5,436,909 A * | 7/1995 | Dev | G06F 11/2257 706/916 |
| 5,555,416 A | 9/1996 | Owens et al. | |
| 5,726,644 A | 3/1998 | Jednacz et al. | |
| 5,742,829 A | 4/1998 | Davis et al. | |
| 5,822,731 A | 10/1998 | Schultz | |
| 5,831,848 A | 11/1998 | Rielly et al. | |
| 5,903,545 A | 5/1999 | Sabourin et al. | |
| 6,012,096 A | 1/2000 | Link et al. | |
| 6,141,595 A | 10/2000 | Gloudeman et al. | |
| 6,144,962 A | 11/2000 | Weinberg et al. | |
| 6,239,699 B1 | 5/2001 | Ronnen | |
| 6,247,058 B1 | 6/2001 | Miller et al. | |
| 6,249,241 B1 | 6/2001 | Jordan et al. | |
| 6,330,562 B1 | 12/2001 | Boden et al. | |
| 6,353,775 B1 | 3/2002 | Nichols | |
| 6,525,658 B2 | 2/2003 | Streetman et al. | |
| 6,546,420 B1 | 4/2003 | Lemler et al. | |
| 6,597,663 B1 | 7/2003 | Rekhter | |
| 6,611,896 B1 | 8/2003 | Mason, Jr. et al. | |
| 6,654,750 B1 | 11/2003 | Adams et al. | |
| 6,728,779 B1 | 4/2004 | Griffin et al. | |
| 6,801,878 B1 | 10/2004 | Hintz et al. | |
| 6,816,461 B1 | 11/2004 | Scrandis et al. | |
| 6,847,993 B1 | 1/2005 | Novaes et al. | |
| 6,848,106 B1 | 1/2005 | Hipp | |
| 6,925,490 B1 | 8/2005 | Novaes et al. | |
| 6,958,998 B2 | 10/2005 | Shorey | |
| 6,983,323 B2 | 1/2006 | Cantrell et al. | |
| 6,996,817 B2 | 2/2006 | Birum et al. | |
| 6,999,452 B1 | 2/2006 | Drummond-Murray et al. | |
| 7,002,464 B2 | 2/2006 | Bruemmer et al. | |
| 7,024,468 B1 | 4/2006 | Meyer et al. | |
| 7,096,368 B2 | 8/2006 | Kouznetsov et al. | |
| 7,111,055 B2 | 9/2006 | Falkner | |
| 7,120,934 B2 | 10/2006 | Ishikawa | |
| 7,133,923 B2 | 11/2006 | MeLampy et al. | |
| 7,162,643 B1 | 1/2007 | Sankaran et al. | |
| 7,181,769 B1 | 2/2007 | Keanini et al. | |
| 7,185,103 B1 | 2/2007 | Jain | |
| 7,203,740 B1 | 4/2007 | Putzolu et al. | |
| 7,302,487 B2 | 11/2007 | Ylonen et al. | |
| 7,337,206 B1 | 2/2008 | Wen et al. | |
| 7,349,761 B1 | 3/2008 | Cruse | |
| 7,353,511 B1 | 4/2008 | Ziese | |
| 7,356,679 B1 | 4/2008 | Le et al. | |
| 7,360,072 B1 | 4/2008 | Soltis et al. | |
| 7,370,092 B2 | 5/2008 | Aderton et al. | |
| 7,395,195 B2 | 7/2008 | Suenbuel et al. | |
| 7,444,404 B2 | 10/2008 | Wetherall et al. | |
| 7,466,681 B2 | 12/2008 | Ashwood-Smith et al. | |
| 7,467,205 B1 | 12/2008 | Dempster et al. | |
| 7,496,040 B2 | 2/2009 | Seo | |
| 7,496,575 B2 | 2/2009 | Buccella et al. | |
| 7,530,105 B2 | 5/2009 | Gilbert et al. | |
| 7,539,770 B2 | 5/2009 | Meier | |
| 7,568,107 B1 | 7/2009 | Rathi et al. | |
| 7,610,330 B1 | 10/2009 | Quinn et al. | |
| 7,633,942 B2 | 12/2009 | Bearden et al. | |
| 7,644,438 B1 | 1/2010 | Dash et al. | |
| 7,676,570 B2 | 3/2010 | Levy et al. | |
| 7,681,131 B1 | 3/2010 | Quarterman et al. | |
| 7,693,947 B2 | 4/2010 | Judge et al. | |
| 7,743,242 B2 | 6/2010 | Oberhaus et al. | |
| 7,752,307 B2 | 7/2010 | Takara | |
| 7,774,498 B1 | 8/2010 | Kraemer et al. | |
| 7,783,457 B2 | 8/2010 | Cunningham | |
| 7,787,480 B1 | 8/2010 | Mehta et al. | |
| 7,788,477 B1 | 8/2010 | Huang et al. | |
| 7,808,897 B1 | 10/2010 | Mehta et al. | |
| 7,813,822 B1 | 10/2010 | Hoffberg | |
| 7,844,696 B2 | 11/2010 | Labovitz et al. | |
| 7,844,744 B2 | 11/2010 | Abercrombie et al. | |
| 7,864,707 B2 | 1/2011 | Dimitropoulos et al. | |
| 7,873,025 B2 | 1/2011 | Patel et al. | |
| 7,873,074 B1 * | 1/2011 | Boland | H04L 12/14 370/468 |
| 7,874,001 B2 | 1/2011 | Beck et al. | |
| 7,885,197 B2 | 2/2011 | Metzler | |
| 7,895,649 B1 | 2/2011 | Brook et al. | |
| 7,904,420 B2 | 3/2011 | Ianni | |
| 7,930,752 B2 | 4/2011 | Hertzog et al. | |
| 7,934,248 B1 | 4/2011 | Yehuda et al. | |
| 7,957,934 B2 | 6/2011 | Greifeneder | |
| 7,961,637 B2 | 6/2011 | McBeath | |
| 7,970,946 B1 | 6/2011 | Djabarov et al. | |
| 7,975,035 B2 | 7/2011 | Popescu et al. | |
| 8,001,610 B1 | 8/2011 | Chickering et al. | |
| 8,005,935 B2 | 8/2011 | Pradhan et al. | |
| 8,040,232 B2 | 10/2011 | Oh et al. | |
| 8,040,822 B2 | 10/2011 | Proulx et al. | |
| 8,056,134 B1 | 11/2011 | Ogilvie | |
| 8,115,617 B2 | 2/2012 | Thubert et al. | |
| 8,135,657 B2 | 3/2012 | Kapoor et al. | |
| 8,156,430 B2 | 4/2012 | Newman | |
| 8,160,063 B2 | 4/2012 | Maltz et al. | |
| 8,179,809 B1 | 5/2012 | Eppstein et al. | |
| 8,181,248 B2 | 5/2012 | Oh et al. | |
| 8,185,824 B1 | 5/2012 | Mitchell et al. | |
| 8,239,365 B2 | 8/2012 | Salman | |
| 8,239,915 B1 | 8/2012 | Satish et al. | |
| 8,250,657 B1 | 8/2012 | Nachenberg et al. | |
| 8,255,972 B2 | 8/2012 | Azagury et al. | |
| 8,266,697 B2 | 9/2012 | Coffman | |
| 8,272,875 B1 | 9/2012 | Jurmain | |
| 8,281,397 B2 | 10/2012 | Vaidyanathan et al. | |
| 8,291,495 B1 | 10/2012 | Burns et al. | |
| 8,296,847 B2 | 10/2012 | Mendonca et al. | |
| 8,311,973 B1 | 11/2012 | Zadeh | |
| 8,365,286 B2 | 1/2013 | Poston | |
| 8,370,407 B1 | 2/2013 | Devarajan et al. | |
| 8,381,289 B1 | 2/2013 | Pereira et al. | |
| 8,391,270 B2 | 3/2013 | Van Der Stok et al. | |
| 8,407,164 B2 | 3/2013 | Malik et al. | |
| 8,407,798 B1 | 3/2013 | Lotem et al. | |
| 8,413,235 B1 | 4/2013 | Chen et al. | |
| 8,442,073 B2 | 5/2013 | Skubacz et al. | |
| 8,451,731 B1 | 5/2013 | Lee et al. | |
| 8,462,212 B1 | 6/2013 | Kundu et al. | |
| 8,489,765 B2 | 7/2013 | Vasseur et al. | |
| 8,499,348 B1 | 7/2013 | Rubin | |
| 8,516,590 B1 | 8/2013 | Ranadive et al. | |
| 8,527,977 B1 | 9/2013 | Cheng et al. | |
| 8,549,635 B2 | 10/2013 | Muttik et al. | |
| 8,570,861 B1 | 10/2013 | Brandwine et al. | |
| 8,572,600 B2 | 10/2013 | Chung et al. | |
| 8,572,734 B2 | 10/2013 | McConnell et al. | |
| 8,572,735 B2 | 10/2013 | Ghosh et al. | |
| 8,572,739 B1 | 10/2013 | Cruz et al. | |
| 8,588,081 B2 | 11/2013 | Salam et al. | |
| 8,600,726 B1 | 12/2013 | Varshney et al. | |
| 8,613,084 B2 | 12/2013 | Dalcher | |
| 8,615,803 B2 | 12/2013 | Dacier et al. | |
| 8,630,316 B2 | 1/2014 | Haba | |
| 8,631,464 B2 | 1/2014 | Belakhdar et al. | |
| 8,640,086 B2 | 1/2014 | Bonev et al. | |
| 8,656,493 B2 | 2/2014 | Capalik | |
| 8,661,544 B2 | 2/2014 | Yen et al. | |
| 8,677,487 B2 | 3/2014 | Balupari et al. | |
| 8,683,389 B1 | 3/2014 | Bar-Yam et al. | |
| 8,706,914 B2 | 4/2014 | Duchesneau | |
| 8,713,676 B2 | 4/2014 | Pandrangi et al. | |

(56) References Cited

U.S. PATENT DOCUMENTS

| | | | |
|---|---|---|---|
| 8,719,452 B1 | 5/2014 | Ding et al. |
| 8,719,835 B2 | 5/2014 | Kanso et al. |
| 8,750,287 B2 | 6/2014 | Bui et al. |
| 8,752,042 B2 | 6/2014 | Ratica |
| 8,752,179 B2 | 6/2014 | Zaitsev |
| 8,755,396 B2 | 6/2014 | Sindhu et al. |
| 8,762,951 B1 | 6/2014 | Kosche et al. |
| 8,769,084 B2 | 7/2014 | Westerfeld et al. |
| 8,775,577 B1 | 7/2014 | Alford et al. |
| 8,776,180 B2 | 7/2014 | Kumar, Sr. et al. |
| 8,812,448 B1 | 8/2014 | Anderson et al. |
| 8,812,725 B2 | 8/2014 | Kulkarni |
| 8,813,236 B1 | 8/2014 | Saha et al. |
| 8,825,848 B1 | 9/2014 | Dotan et al. |
| 8,832,013 B1 | 9/2014 | Adams et al. |
| 8,832,461 B2 | 9/2014 | Saroiu et al. |
| 8,849,926 B2 | 9/2014 | Marzencki et al. |
| 8,881,258 B2 | 11/2014 | Paul et al. |
| 8,887,238 B2 | 11/2014 | Howard et al. |
| 8,904,520 B1 | 12/2014 | Nachenberg et al. |
| 8,908,685 B2 | 12/2014 | Patel et al. |
| 8,914,497 B1 | 12/2014 | Xiao et al. |
| 8,931,043 B2 | 1/2015 | Cooper et al. |
| 8,954,610 B2 | 2/2015 | Berke et al. |
| 8,955,124 B2 | 2/2015 | Kim et al. |
| 8,966,021 B1 | 2/2015 | Allen |
| 8,966,625 B1 | 2/2015 | Zuk et al. |
| 8,973,147 B2 | 3/2015 | Pearcy et al. |
| 8,984,331 B2 | 3/2015 | Quinn |
| 8,990,386 B2 | 3/2015 | He et al. |
| 8,996,695 B2 | 3/2015 | Anderson et al. |
| 8,997,227 B1 | 3/2015 | Mhatre et al. |
| 9,014,047 B2 | 4/2015 | Alcala et al. |
| 9,015,716 B2 | 4/2015 | Fletcher et al. |
| 9,071,575 B2 | 6/2015 | Lemaster et al. |
| 9,088,598 B1 | 7/2015 | Zhang et al. |
| 9,110,905 B2 | 8/2015 | Polley et al. |
| 9,117,075 B1 | 8/2015 | Yeh |
| 9,130,836 B2 | 9/2015 | Kapadia et al. |
| 9,152,789 B2 | 10/2015 | Natarajan, Sr. et al. |
| 9,160,764 B2 | 10/2015 | Stiansen et al. |
| 9,170,917 B2 | 10/2015 | Kumar et al. |
| 9,178,906 B1 | 11/2015 | Chen et al. |
| 9,185,127 B2 | 11/2015 | Neou et al. |
| 9,191,400 B1 | 11/2015 | Ptasinski et al. |
| 9,191,402 B2 | 11/2015 | Yan |
| 9,197,654 B2 | 11/2015 | Ben-Shalom et al. |
| 9,225,793 B2 | 12/2015 | Dutta et al. |
| 9,237,111 B2 | 1/2016 | Banavalikar et al. |
| 9,246,702 B1 | 1/2016 | Sharma et al. |
| 9,246,773 B2 | 1/2016 | Degioanni |
| 9,253,042 B2 | 2/2016 | Lumezanu et al. |
| 9,253,206 B1 | 2/2016 | Fleischman |
| 9,258,217 B2 | 2/2016 | Duffield et al. |
| 9,281,940 B2 | 3/2016 | Matsuda et al. |
| 9,286,047 B1 | 3/2016 | Avramov et al. |
| 9,294,486 B1 | 3/2016 | Chiang et al. |
| 9,317,574 B1 | 4/2016 | Brisebois et al. |
| 9,319,384 B2 | 4/2016 | Yan et al. |
| 9,369,435 B2 | 6/2016 | Short et al. |
| 9,369,479 B2 | 6/2016 | Lin |
| 9,378,068 B2 | 6/2016 | Anantharam et al. |
| 9,396,327 B2 | 7/2016 | Auger et al. |
| 9,405,903 B1 | 8/2016 | Xie et al. |
| 9,417,985 B2 | 8/2016 | Baars et al. |
| 9,418,222 B1 | 8/2016 | Rivera et al. |
| 9,426,068 B2 | 8/2016 | Dunbar et al. |
| 9,454,324 B1 | 9/2016 | Madhavapeddi |
| 9,462,013 B1 | 10/2016 | Boss et al. |
| 9,465,696 B2 | 10/2016 | McNeil et al. |
| 9,501,744 B1 | 11/2016 | Brisebois et al. |
| 9,531,589 B2 | 12/2016 | Clemm et al. |
| 9,563,517 B1 | 2/2017 | Natanzon et al. |
| 9,621,413 B1 | 4/2017 | Lee |
| 9,634,915 B2 | 4/2017 | Bley |
| 9,645,892 B1 | 5/2017 | Patwardhan |
| 9,684,453 B2 | 6/2017 | Holt et al. |
| 9,697,033 B2 | 7/2017 | Koponen et al. |
| 9,733,973 B2 | 8/2017 | Prasad et al. |
| 9,749,145 B2 | 8/2017 | Banavalikar et al. |
| 9,800,608 B2 | 10/2017 | Korsunsky et al. |
| 9,904,584 B2 | 2/2018 | Konig et al. |
| 9,916,538 B2 | 3/2018 | Zadeh et al. |
| 9,935,851 B2 | 4/2018 | Gandham et al. |
| 10,009,240 B2 | 6/2018 | Rao et al. |
| 2001/0028646 A1 | 10/2001 | Arts et al. |
| 2002/0053033 A1 | 5/2002 | Cooper et al. |
| 2002/0097687 A1 | 7/2002 | Meiri et al. |
| 2002/0103793 A1 | 8/2002 | Koller et al. |
| 2002/0107857 A1 | 8/2002 | Teraslinna |
| 2002/0141343 A1 | 10/2002 | Bays |
| 2002/0184393 A1 | 12/2002 | Leddy et al. |
| 2003/0023601 A1 | 1/2003 | Fortier, Jr. et al. |
| 2003/0065986 A1* | 4/2003 | Fraenkel ............ G06F 11/3006 714/47.2 |
| 2003/0097439 A1 | 5/2003 | Strayer et al. |
| 2003/0126242 A1 | 7/2003 | Chang |
| 2003/0145232 A1 | 7/2003 | Poletto et al. |
| 2003/0151513 A1 | 8/2003 | Herrmann et al. |
| 2003/0154399 A1 | 8/2003 | Zuk et al. |
| 2003/0177208 A1 | 9/2003 | Harvey, IV |
| 2004/0019676 A1* | 1/2004 | Iwatsuki ............ H04L 43/0805 709/224 |
| 2004/0030776 A1 | 2/2004 | Cantrell et al. |
| 2004/0213221 A1 | 10/2004 | Civanlar et al. |
| 2004/0220984 A1 | 11/2004 | Dudfield et al. |
| 2004/0243533 A1 | 12/2004 | Dempster et al. |
| 2004/0255050 A1 | 12/2004 | Takehiro et al. |
| 2004/0268149 A1 | 12/2004 | Aaron |
| 2005/0028154 A1 | 2/2005 | Smith et al. |
| 2005/0039104 A1 | 2/2005 | Shah et al. |
| 2005/0063377 A1 | 3/2005 | Bryant et al. |
| 2005/0083933 A1 | 4/2005 | Fine et al. |
| 2005/0108331 A1 | 5/2005 | Osterman |
| 2005/0122325 A1 | 6/2005 | Twait |
| 2005/0138157 A1 | 6/2005 | Jung et al. |
| 2005/0166066 A1 | 7/2005 | Ahuja et al. |
| 2005/0177829 A1 | 8/2005 | Vishwanath |
| 2005/0182681 A1 | 8/2005 | Bruskotter et al. |
| 2005/0185621 A1 | 8/2005 | Sivakumar et al. |
| 2005/0198247 A1* | 9/2005 | Perry ................ H04L 7/0008 709/223 |
| 2005/0198371 A1 | 9/2005 | Smith et al. |
| 2005/0198629 A1 | 9/2005 | Vishwanath |
| 2005/0207376 A1 | 9/2005 | Ashwood-Smith et al. |
| 2005/0257244 A1 | 11/2005 | Joly et al. |
| 2005/0289244 A1 | 12/2005 | Sahu et al. |
| 2006/0048218 A1 | 3/2006 | Lingafelt et al. |
| 2006/0077909 A1 | 4/2006 | Saleh et al. |
| 2006/0080733 A1 | 4/2006 | Khosmood et al. |
| 2006/0089985 A1 | 4/2006 | Poletto |
| 2006/0095968 A1 | 5/2006 | Portolani et al. |
| 2006/0143432 A1 | 6/2006 | Rothman et al. |
| 2006/0156408 A1 | 7/2006 | Himberger et al. |
| 2006/0159032 A1 | 7/2006 | Ukrainetz et al. |
| 2006/0173912 A1 | 8/2006 | Lindvall et al. |
| 2006/0195448 A1 | 8/2006 | Newport |
| 2006/0272018 A1 | 11/2006 | Fouant |
| 2006/0274659 A1 | 12/2006 | Ouderkirk |
| 2006/0280179 A1 | 12/2006 | Meier |
| 2006/0294219 A1 | 12/2006 | Ogawa et al. |
| 2007/0014275 A1 | 1/2007 | Bettink et al. |
| 2007/0025306 A1 | 2/2007 | Cox et al. |
| 2007/0044147 A1 | 2/2007 | Choi et al. |
| 2007/0097976 A1 | 5/2007 | Wood et al. |
| 2007/0118654 A1 | 5/2007 | Jamkhedkar et al. |
| 2007/0127491 A1 | 6/2007 | Verzijp et al. |
| 2007/0162420 A1 | 7/2007 | Ou et al. |
| 2007/0169179 A1 | 7/2007 | Narad |
| 2007/0195729 A1 | 8/2007 | Li et al. |
| 2007/0195794 A1 | 8/2007 | Fujita et al. |
| 2007/0195797 A1 | 8/2007 | Patel et al. |
| 2007/0201474 A1 | 8/2007 | Isobe |
| 2007/0211637 A1 | 9/2007 | Mitchell |

(56) References Cited

U.S. PATENT DOCUMENTS

| | | |
|---|---|---|
| 2007/0214348 A1 | 9/2007 | Danielsen |
| 2007/0230415 A1 | 10/2007 | Malik |
| 2007/0232265 A1 | 10/2007 | Park et al. |
| 2007/0250930 A1 | 10/2007 | Aziz et al. |
| 2007/0300061 A1 | 12/2007 | Kim et al. |
| 2008/0002697 A1 | 1/2008 | Anantharamaiah et al. |
| 2008/0022385 A1 | 1/2008 | Crowell et al. |
| 2008/0028389 A1 | 1/2008 | Genty et al. |
| 2008/0046708 A1 | 2/2008 | Fitzgerald et al. |
| 2008/0049633 A1 | 2/2008 | Edwards et al. |
| 2008/0056124 A1 | 3/2008 | Nanda et al. |
| 2008/0082662 A1 | 4/2008 | Danliker et al. |
| 2008/0101234 A1 | 5/2008 | Nakil et al. |
| 2008/0120350 A1 | 5/2008 | Grabowski et al. |
| 2008/0126534 A1 | 5/2008 | Mueller et al. |
| 2008/0141246 A1 | 6/2008 | Kuck et al. |
| 2008/0155245 A1 | 6/2008 | Lipscombe et al. |
| 2008/0250122 A1 | 10/2008 | Zsigmond et al. |
| 2008/0270199 A1 | 10/2008 | Chess et al. |
| 2008/0282347 A1 | 11/2008 | Dadhia et al. |
| 2008/0295163 A1 | 11/2008 | Kang |
| 2008/0301765 A1 | 12/2008 | Nicol et al. |
| 2009/0059934 A1 | 3/2009 | Aggarwal et al. |
| 2009/0064332 A1 | 3/2009 | Porras et al. |
| 2009/0109849 A1 | 4/2009 | Wood et al. |
| 2009/0133126 A1 | 5/2009 | Jang et al. |
| 2009/0138590 A1 | 5/2009 | Lee et al. |
| 2009/0180393 A1 | 7/2009 | Nakamura |
| 2009/0241170 A1 | 9/2009 | Kumar et al. |
| 2009/0292795 A1 | 11/2009 | Ford et al. |
| 2009/0296593 A1 | 12/2009 | Prescott |
| 2009/0300180 A1 | 12/2009 | Dehaan et al. |
| 2009/0307753 A1 | 12/2009 | Dupont et al. |
| 2009/0313373 A1 | 12/2009 | Hanna et al. |
| 2009/0313698 A1 | 12/2009 | Wahl |
| 2009/0319912 A1 | 12/2009 | Serr et al. |
| 2009/0323543 A1 | 12/2009 | Shimakura |
| 2009/0328219 A1 | 12/2009 | Narayanaswamy |
| 2010/0005288 A1 | 1/2010 | Rao et al. |
| 2010/0049839 A1 | 2/2010 | Parker et al. |
| 2010/0054241 A1 | 3/2010 | Shah et al. |
| 2010/0077445 A1 | 3/2010 | Schneider et al. |
| 2010/0095293 A1 | 4/2010 | O'Neill et al. |
| 2010/0095367 A1 | 4/2010 | Narayanaswamy |
| 2010/0095377 A1 | 4/2010 | Krywaniuk |
| 2010/0138526 A1 | 6/2010 | DeHaan et al. |
| 2010/0138810 A1 | 6/2010 | Komatsu et al. |
| 2010/0148940 A1 | 6/2010 | Gelvin et al. |
| 2010/0153316 A1 | 6/2010 | Duffield et al. |
| 2010/0153696 A1 | 6/2010 | Beachem et al. |
| 2010/0180016 A1 | 7/2010 | Bugwadia et al. |
| 2010/0194741 A1 | 8/2010 | Finocchio |
| 2010/0220584 A1 | 9/2010 | DeHaan et al. |
| 2010/0235514 A1 | 9/2010 | Beachem |
| 2010/0235879 A1 | 9/2010 | Burnside et al. |
| 2010/0235915 A1 | 9/2010 | Memon et al. |
| 2010/0287266 A1 | 11/2010 | Asati et al. |
| 2010/0303240 A1 | 12/2010 | Beachem |
| 2010/0306180 A1 | 12/2010 | Johnson et al. |
| 2010/0317420 A1 | 12/2010 | Hoffberg |
| 2010/0319060 A1 | 12/2010 | Aiken et al. |
| 2011/0004935 A1 | 1/2011 | Moffie et al. |
| 2011/0010585 A1 | 1/2011 | Bugenhagen et al. |
| 2011/0022641 A1 | 1/2011 | Werth et al. |
| 2011/0055381 A1 | 3/2011 | Narasimhan et al. |
| 2011/0055388 A1 | 3/2011 | Yumerefendi et al. |
| 2011/0066719 A1 | 3/2011 | Miryanov et al. |
| 2011/0069685 A1 | 3/2011 | Tofighbakhsh |
| 2011/0072119 A1 | 3/2011 | Bronstein et al. |
| 2011/0083125 A1 | 4/2011 | Komatsu et al. |
| 2011/0085556 A1 | 4/2011 | Breslin et al. |
| 2011/0103259 A1 | 5/2011 | Aybay et al. |
| 2011/0107074 A1 | 5/2011 | Chan et al. |
| 2011/0107331 A1 | 5/2011 | Evans et al. |
| 2011/0126136 A1 | 5/2011 | Abella et al. |
| 2011/0126275 A1 | 5/2011 | Anderson et al. |
| 2011/0145885 A1 | 6/2011 | Rivers et al. |
| 2011/0153039 A1 | 6/2011 | Gvelesiani et al. |
| 2011/0153811 A1 | 6/2011 | Jeong et al. |
| 2011/0158088 A1 | 6/2011 | Lofstrand et al. |
| 2011/0170860 A1 | 7/2011 | Smith et al. |
| 2011/0173490 A1 | 7/2011 | Narayanaswamy et al. |
| 2011/0185423 A1 | 7/2011 | Sallam |
| 2011/0196957 A1 | 8/2011 | Ayachitula et al. |
| 2011/0202655 A1 | 8/2011 | Sharma et al. |
| 2011/0214174 A1 | 9/2011 | Herzog et al. |
| 2011/0225207 A1 | 9/2011 | Subramanian et al. |
| 2011/0228696 A1 | 9/2011 | Agarwal et al. |
| 2011/0238793 A1 | 9/2011 | Bedare et al. |
| 2011/0246663 A1 | 10/2011 | Melsen et al. |
| 2011/0277034 A1 | 11/2011 | Hanson |
| 2011/0283277 A1 | 11/2011 | Castillo et al. |
| 2011/0302652 A1 | 12/2011 | Westerfeld |
| 2011/0314148 A1 | 12/2011 | Petersen et al. |
| 2011/0317982 A1 | 12/2011 | Xu et al. |
| 2012/0005542 A1 | 1/2012 | Petersen et al. |
| 2012/0079592 A1 | 3/2012 | Pandrangi |
| 2012/0089664 A1 | 4/2012 | Igelka |
| 2012/0102361 A1 | 4/2012 | Sass et al. |
| 2012/0102543 A1 | 4/2012 | Kohli et al. |
| 2012/0110188 A1 | 5/2012 | Van Biljon et al. |
| 2012/0117226 A1 | 5/2012 | Tanaka et al. |
| 2012/0117642 A1 | 5/2012 | Lin et al. |
| 2012/0136996 A1 | 5/2012 | Seo et al. |
| 2012/0137278 A1 | 5/2012 | Draper et al. |
| 2012/0137361 A1 | 5/2012 | Yi et al. |
| 2012/0140626 A1 | 6/2012 | Anand et al. |
| 2012/0195198 A1 | 8/2012 | Regan |
| 2012/0197856 A1 | 8/2012 | Banka et al. |
| 2012/0198541 A1 | 8/2012 | Reeves |
| 2012/0216271 A1 | 8/2012 | Cooper et al. |
| 2012/0218989 A1 | 8/2012 | Tanabe et al. |
| 2012/0219004 A1 | 8/2012 | Balus et al. |
| 2012/0233348 A1 | 9/2012 | Winters |
| 2012/0233473 A1 | 9/2012 | Vasseur et al. |
| 2012/0240232 A1 | 9/2012 | Azuma |
| 2012/0246303 A1 | 9/2012 | Petersen et al. |
| 2012/0254109 A1 | 10/2012 | Shukla et al. |
| 2012/0260227 A1 | 10/2012 | Shukla et al. |
| 2012/0278021 A1 | 11/2012 | Lin et al. |
| 2012/0281700 A1 | 11/2012 | Koganti et al. |
| 2012/0300628 A1 | 11/2012 | Prescott et al. |
| 2013/0003538 A1 | 1/2013 | Greenburg et al. |
| 2013/0003733 A1 | 1/2013 | Venkatesan et al. |
| 2013/0006935 A1 | 1/2013 | Grisby |
| 2013/0007435 A1 | 1/2013 | Bayani |
| 2013/0038358 A1 | 2/2013 | Cook et al. |
| 2013/0041934 A1 | 2/2013 | Annamalaisami et al. |
| 2013/0054682 A1 | 2/2013 | Malik et al. |
| 2013/0085889 A1 | 4/2013 | Fitting et al. |
| 2013/0086272 A1 | 4/2013 | Chen et al. |
| 2013/0103827 A1 | 4/2013 | Dunlap et al. |
| 2013/0107709 A1 | 5/2013 | Campbell et al. |
| 2013/0124807 A1 | 5/2013 | Nielsen et al. |
| 2013/0125107 A1 | 5/2013 | Bandakka et al. |
| 2013/0145099 A1 | 6/2013 | Liu et al. |
| 2013/0148663 A1 | 6/2013 | Xiong |
| 2013/0159999 A1 | 6/2013 | Chiueh et al. |
| 2013/0173784 A1 | 7/2013 | Wang et al. |
| 2013/0174256 A1 | 7/2013 | Powers |
| 2013/0179487 A1 | 7/2013 | Lubetzky et al. |
| 2013/0179879 A1 | 7/2013 | Zhang et al. |
| 2013/0198517 A1 | 8/2013 | Mazzarella |
| 2013/0198839 A1 | 8/2013 | Wei et al. |
| 2013/0201986 A1 | 8/2013 | Sajassi et al. |
| 2013/0205293 A1 | 8/2013 | Levijarvi et al. |
| 2013/0219161 A1 | 8/2013 | Fontignie et al. |
| 2013/0219500 A1 | 8/2013 | Lukas et al. |
| 2013/0232498 A1 | 9/2013 | Mangtani et al. |
| 2013/0242999 A1 | 9/2013 | Kamble et al. |
| 2013/0246925 A1 | 9/2013 | Ahuja et al. |
| 2013/0247201 A1 | 9/2013 | Alperovitch et al. |
| 2013/0254879 A1 | 9/2013 | Chesla et al. |
| 2013/0268994 A1 | 10/2013 | Cooper et al. |

(56) References Cited

U.S. PATENT DOCUMENTS

| | | |
|---|---|---|
| 2013/0275579 A1 | 10/2013 | Hernandez et al. |
| 2013/0283374 A1 | 10/2013 | Zisapel et al. |
| 2013/0290521 A1 | 10/2013 | Labovitz |
| 2013/0297771 A1 | 11/2013 | Osterloh et al. |
| 2013/0301472 A1 | 11/2013 | Allan |
| 2013/0304900 A1 | 11/2013 | Trabelsi et al. |
| 2013/0305369 A1 | 11/2013 | Karta et al. |
| 2013/0318357 A1 | 11/2013 | Abraham et al. |
| 2013/0326623 A1 | 12/2013 | Kruglick |
| 2013/0333029 A1 | 12/2013 | Chesla et al. |
| 2013/0336164 A1 | 12/2013 | Yang et al. |
| 2013/0346736 A1 | 12/2013 | Cook et al. |
| 2013/0347103 A1 | 12/2013 | Veteikis et al. |
| 2014/0006610 A1 | 1/2014 | Formby et al. |
| 2014/0006871 A1 | 1/2014 | Lakshmanan et al. |
| 2014/0012814 A1 | 1/2014 | Bercovici et al. |
| 2014/0019972 A1 | 1/2014 | Yahalom et al. |
| 2014/0031005 A1 | 1/2014 | Sumcad et al. |
| 2014/0033193 A1 | 1/2014 | Palaniappan |
| 2014/0036688 A1 | 2/2014 | Stassinopoulos et al. |
| 2014/0040343 A1 | 2/2014 | Nickolov et al. |
| 2014/0047185 A1 | 2/2014 | Peterson et al. |
| 2014/0047372 A1 | 2/2014 | Gnezdov et al. |
| 2014/0056318 A1 | 2/2014 | Hansson et al. |
| 2014/0059200 A1 | 2/2014 | Nguyen et al. |
| 2014/0074946 A1 | 3/2014 | Dirstine et al. |
| 2014/0089494 A1 | 3/2014 | Dasari et al. |
| 2014/0092884 A1 | 4/2014 | Murphy et al. |
| 2014/0096058 A1 | 4/2014 | Molesky et al. |
| 2014/0105029 A1 | 4/2014 | Jain et al. |
| 2014/0115219 A1 | 4/2014 | Ajanovic et al. |
| 2014/0129942 A1 | 5/2014 | Rathod |
| 2014/0137109 A1 | 5/2014 | Sharma et al. |
| 2014/0140244 A1 | 5/2014 | Kapadia et al. |
| 2014/0143825 A1 | 5/2014 | Behrendt et al. |
| 2014/0149490 A1 | 5/2014 | Luxenberg et al. |
| 2014/0156814 A1 | 6/2014 | Barabash et al. |
| 2014/0156861 A1 | 6/2014 | Cruz-Aguilar et al. |
| 2014/0164607 A1 | 6/2014 | Bai et al. |
| 2014/0165200 A1 | 6/2014 | Singla |
| 2014/0165207 A1 | 6/2014 | Engel et al. |
| 2014/0173623 A1 | 6/2014 | Chang et al. |
| 2014/0192639 A1 | 7/2014 | Smirnov |
| 2014/0201717 A1 | 7/2014 | Mascaro et al. |
| 2014/0215573 A1 | 7/2014 | Cepuran |
| 2014/0215621 A1 | 7/2014 | Xaypanya et al. |
| 2014/0224784 A1 | 8/2014 | Kohler |
| 2014/0225603 A1 | 8/2014 | Auguste et al. |
| 2014/0233387 A1 | 8/2014 | Zheng et al. |
| 2014/0269777 A1 | 9/2014 | Rothstein et al. |
| 2014/0280499 A1 | 9/2014 | Basavaiah et al. |
| 2014/0281030 A1 | 9/2014 | Cui et al. |
| 2014/0286354 A1 | 9/2014 | Van De Poel et al. |
| 2014/0289854 A1 | 9/2014 | Mahvi |
| 2014/0298461 A1 | 10/2014 | Hohndel et al. |
| 2014/0307686 A1 | 10/2014 | Su et al. |
| 2014/0317278 A1 | 10/2014 | Kersch et al. |
| 2014/0317737 A1 | 10/2014 | Shin et al. |
| 2014/0330616 A1 | 11/2014 | Lyras |
| 2014/0331048 A1 | 11/2014 | Casas-Sanchez et al. |
| 2014/0331276 A1 | 11/2014 | Frascadore et al. |
| 2014/0331280 A1 | 11/2014 | Porras et al. |
| 2014/0331304 A1 | 11/2014 | Wong |
| 2014/0348182 A1 | 11/2014 | Chandra et al. |
| 2014/0351203 A1 | 11/2014 | Kunnatur et al. |
| 2014/0351415 A1 | 11/2014 | Harrigan et al. |
| 2014/0359695 A1 | 12/2014 | Chari et al. |
| 2015/0006689 A1 | 1/2015 | Szilagyi et al. |
| 2015/0006714 A1 | 1/2015 | Jain |
| 2015/0009840 A1 | 1/2015 | Pruthi et al. |
| 2015/0026809 A1 | 1/2015 | Altman et al. |
| 2015/0033305 A1 | 1/2015 | Shear et al. |
| 2015/0036480 A1 | 2/2015 | Huang et al. |
| 2015/0036533 A1 | 2/2015 | Sodhi et al. |
| 2015/0039751 A1 | 2/2015 | Harrigan et al. |
| 2015/0046882 A1 | 2/2015 | Menyhart et al. |
| 2015/0052441 A1 | 2/2015 | Degioanni |
| 2015/0058976 A1 | 2/2015 | Carney et al. |
| 2015/0067143 A1 | 3/2015 | Babakhan et al. |
| 2015/0067786 A1 | 3/2015 | Fiske |
| 2015/0082151 A1 | 3/2015 | Liang et al. |
| 2015/0082430 A1 | 3/2015 | Sridhara et al. |
| 2015/0085665 A1 | 3/2015 | Kompella et al. |
| 2015/0095332 A1 | 4/2015 | Beisiegel et al. |
| 2015/0112933 A1 | 4/2015 | Satapathy |
| 2015/0113133 A1 | 4/2015 | Srinivas et al. |
| 2015/0124608 A1 | 5/2015 | Agarwal et al. |
| 2015/0124652 A1 | 5/2015 | Dhamapurikar et al. |
| 2015/0128133 A1 | 5/2015 | Pohlmann |
| 2015/0128205 A1 | 5/2015 | Mahaffey et al. |
| 2015/0138993 A1 | 5/2015 | Forster et al. |
| 2015/0142962 A1 | 5/2015 | Srinivas et al. |
| 2015/0195291 A1 | 7/2015 | Zuk et al. |
| 2015/0222939 A1 | 8/2015 | Gallant et al. |
| 2015/0249622 A1 | 9/2015 | Phillips et al. |
| 2015/0256555 A1 | 9/2015 | Choi et al. |
| 2015/0261842 A1 | 9/2015 | Huang et al. |
| 2015/0261886 A1 | 9/2015 | Wu et al. |
| 2015/0271008 A1 | 9/2015 | Jain et al. |
| 2015/0271255 A1 | 9/2015 | Mackay et al. |
| 2015/0295945 A1 | 10/2015 | Canzanese, Jr. et al. |
| 2015/0312233 A1 | 10/2015 | Graham, III et al. |
| 2015/0347554 A1 | 12/2015 | Vasantham et al. |
| 2015/0356297 A1 | 12/2015 | Guri et al. |
| 2015/0358352 A1 | 12/2015 | Chasin et al. |
| 2016/0006753 A1 | 1/2016 | McDaid et al. |
| 2016/0019030 A1 | 1/2016 | Shukla et al. |
| 2016/0020959 A1 | 1/2016 | Rahaman |
| 2016/0021131 A1 | 1/2016 | Heilig |
| 2016/0026552 A1 | 1/2016 | Holden et al. |
| 2016/0036636 A1 | 2/2016 | Erickson et al. |
| 2016/0036837 A1 | 2/2016 | Jain et al. |
| 2016/0050132 A1 | 2/2016 | Zhang et al. |
| 2016/0072815 A1 | 3/2016 | Rieke et al. |
| 2016/0080414 A1 | 3/2016 | Kolton et al. |
| 2016/0087861 A1* | 3/2016 | Kuan .................. H04L 43/065 709/224 |
| 2016/0094394 A1 | 3/2016 | Sharma et al. |
| 2016/0094529 A1 | 3/2016 | Mityagin |
| 2016/0103692 A1 | 4/2016 | Guntaka et al. |
| 2016/0105350 A1 | 4/2016 | Greifeneder et al. |
| 2016/0112270 A1 | 4/2016 | Danait et al. |
| 2016/0112284 A1 | 4/2016 | Pon et al. |
| 2016/0119234 A1 | 4/2016 | Valencia Lopez et al. |
| 2016/0127395 A1 | 5/2016 | Underwood et al. |
| 2016/0147585 A1 | 5/2016 | Konig et al. |
| 2016/0162308 A1 | 6/2016 | Chen et al. |
| 2016/0162312 A1 | 6/2016 | Doherty et al. |
| 2016/0173446 A1 | 6/2016 | Nantel |
| 2016/0173535 A1 | 6/2016 | Barabash et al. |
| 2016/0183093 A1 | 6/2016 | Vaughn et al. |
| 2016/0191476 A1 | 6/2016 | Schutz et al. |
| 2016/0205002 A1 | 7/2016 | Rieke et al. |
| 2016/0216994 A1 | 7/2016 | Sefidcon et al. |
| 2016/0217022 A1 | 7/2016 | Velipasaoglu et al. |
| 2016/0255082 A1 | 9/2016 | Rathod |
| 2016/0269424 A1 | 9/2016 | Chandola et al. |
| 2016/0269442 A1 | 9/2016 | Shieh |
| 2016/0269482 A1 | 9/2016 | Jamjoom et al. |
| 2016/0294691 A1 | 10/2016 | Joshi |
| 2016/0308908 A1 | 10/2016 | Kirby et al. |
| 2016/0357424 A1 | 12/2016 | Pang et al. |
| 2016/0357546 A1 | 12/2016 | Chang et al. |
| 2016/0357587 A1 | 12/2016 | Yadav et al. |
| 2016/0357957 A1 | 12/2016 | Deen et al. |
| 2016/0359592 A1 | 12/2016 | Kulshreshtha et al. |
| 2016/0359628 A1 | 12/2016 | Singh et al. |
| 2016/0359658 A1 | 12/2016 | Yadav et al. |
| 2016/0359673 A1 | 12/2016 | Gupta et al. |
| 2016/0359677 A1 | 12/2016 | Kulshreshtha et al. |
| 2016/0359678 A1 | 12/2016 | Madani et al. |
| 2016/0359679 A1 | 12/2016 | Parasdehgheibi et al. |
| 2016/0359680 A1 | 12/2016 | Parasdehgheibi et al. |
| 2016/0359686 A1 | 12/2016 | Parasdehgheibi et al. |

(56) References Cited

U.S. PATENT DOCUMENTS

| | | |
|---|---|---|
| 2016/0359695 A1 | 12/2016 | Yadav et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359700 A1 | 12/2016 | Pang et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |
| 2016/0359705 A1 | 12/2016 | Parasdehgheibi et al. |
| 2016/0359708 A1 | 12/2016 | Gandham et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parasdehgheibi et al. |
| 2016/0359759 A1 | 12/2016 | Singh et al. |
| 2016/0359872 A1 | 12/2016 | Yadav et al. |
| 2016/0359877 A1 | 12/2016 | Kulshreshtha et al. |
| 2016/0359878 A1 | 12/2016 | Prasad et al. |
| 2016/0359879 A1 | 12/2016 | Deen et al. |
| 2016/0359880 A1 | 12/2016 | Pang et al. |
| 2016/0359881 A1 | 12/2016 | Yadav et al. |
| 2016/0359888 A1 | 12/2016 | Gupta et al. |
| 2016/0359889 A1 | 12/2016 | Yadav et al. |
| 2016/0359890 A1 | 12/2016 | Deen et al. |
| 2016/0359891 A1 | 12/2016 | Pang et al. |
| 2016/0359897 A1 | 12/2016 | Yadav et al. |
| 2016/0359905 A1 | 12/2016 | Touboul et al. |
| 2016/0359912 A1 | 12/2016 | Gupta et al. |
| 2016/0359913 A1 | 12/2016 | Gupta et al. |
| 2016/0359914 A1 | 12/2016 | Deen et al. |
| 2016/0359915 A1 | 12/2016 | Gupta et al. |
| 2016/0359917 A1 | 12/2016 | Rao et al. |
| 2016/0373481 A1 | 12/2016 | Sultan et al. |
| 2016/0380865 A1 | 12/2016 | Dubai et al. |
| 2017/0006141 A1 | 1/2017 | Bhadra |
| 2017/0024453 A1 | 1/2017 | Raja et al. |
| 2017/0032310 A1 | 2/2017 | Mimnaugh |
| 2017/0034018 A1 | 2/2017 | Parasdehgheibi et al. |
| 2017/0048121 A1 | 2/2017 | Hobbs et al. |
| 2017/0070582 A1 | 3/2017 | Desai et al. |
| 2017/0085483 A1 | 3/2017 | Mihaly et al. |
| 2017/0208487 A1 | 7/2017 | Ratakonda et al. |
| 2017/0250880 A1 | 8/2017 | Akens et al. |
| 2017/0250951 A1 | 8/2017 | Wang et al. |
| 2017/0289067 A1 | 10/2017 | Lu et al. |
| 2017/0295141 A1 | 10/2017 | Thubert et al. |
| 2017/0302691 A1 | 10/2017 | Singh et al. |
| 2017/0331747 A1 | 11/2017 | Singh et al. |
| 2017/0346736 A1 | 11/2017 | Chander et al. |
| 2017/0364380 A1 | 12/2017 | Frye, Jr. et al. |
| 2018/0006911 A1 | 1/2018 | Dickey |
| 2018/0007115 A1 | 1/2018 | Nedeltchev et al. |
| 2018/0013670 A1 | 1/2018 | Kapadia et al. |
| 2018/0145906 A1 | 5/2018 | Yadav et al. |

FOREIGN PATENT DOCUMENTS

| | | |
|---|---|---|
| CN | 102521537 | 6/2012 |
| CN | 103023970 | 4/2013 |
| CN | 103716137 | 4/2014 |
| CN | 104065518 | 9/2014 |
| CN | 107196807 | 9/2017 |
| EP | 0811942 | 12/1997 |
| EP | 1076848 | 7/2002 |
| EP | 1383261 | 1/2004 |
| EP | 1450511 | 8/2004 |
| EP | 2045974 | 4/2008 |
| EP | 2043320 | 4/2009 |
| EP | 2860912 | 4/2015 |
| EP | 2887595 | 6/2015 |
| JP | 2009-016906 | 1/2009 |
| KR | 1394338 | 5/2014 |
| WO | WO 2007/014314 | 2/2007 |
| WO | WO 2007/070711 | 6/2007 |
| WO | WO 2008/069439 | 6/2008 |
| WO | WO 2013/030830 | 3/2013 |
| WO | WO 2015/042171 | 3/2015 |
| WO | WO 2015/099778 | 7/2015 |
| WO | WO 2016/004075 | 1/2016 |
| WO | WO 2016/019523 | 2/2016 |

OTHER PUBLICATIONS

Arista Networks, Inc., "Application Visibility and Network Telemtry using Splunk," Arista White Paper, Nov. 2013, 11 pages.

Australian Government Department of Defence, Intelligence and Security, "Top 4 Strategies to Mitigate Targeted Cyber Intrusions," Cyber Security Operations Centre July 2013, http://www.asd.gov.au/infosec/top-mitigations/top-4-strategies-explained.htm.

Aydin, Galip, et al., "Architecture and Implementation of a Scalable Sensor Data Storage and Analysis Using Cloud Computing and Big Data Technologies," Journal of Sensors, vol. 2015, Article ID 834217, Feb. 2015, 11 pages.

Backes, Michael, et al., "Data Lineage in Malicious Environments," IEEE 2015, pp. 1-13.

Bauch, Petr, "Reader's Report of Master's Thesis, Analysis and Testing of Distributed NoSQL Datastore Riak," May 28, 2015, Brno. 2 pages.

Bayati, Mohsen, et al., "Message-Passing Algorithms for Sparse Network Alignment," Mar. 2013, 31 pages.

Berezinski, Przemyslaw, et al., "An Entropy-Based Network Anomaly Detection Method," Entropy, 2015, vol. 17, www.mdpi.com/journal/entropy, pp. 2367-2408.

Berthier, Robin, et al. "Nfsight: Netflow-based Network Awareness Tool," 2010, 16 pages.

Bhuyan, Dhiraj, "Fighting Bots and Botnets," 2006, pp. 23-28.

Blair, Dana, et al., U.S. Appl. No. 62/106,006, tiled Jan. 21, 2015, entitled "Monitoring Network Policy Compliance.".

Bosch, Greg, "Virtualization," 2010, 33 pages.

Breen, Christopher, "MAC 911, How to dismiss Mac App Store Notifications," Macworld.com, Mar. 24, 2014, 3 pages.

Chandran, Midhun, et al., "Monitoring in a Virtualized Environment," GSTF International Journal on Computing, vol. 1, No. 1, Aug. 2010.

Chou, C.W., et al., "Optical Clocks and Relativity," Science vol. 329, Sep. 24, 2010, pp. 1630-1633.

Cisco Systems, Inc., "Addressing Compliance from One Infrastructure: Cisco Unified Compliance Solution Framework," 2014.

Cisco Systems, Inc., "Cisco Application Dependency Mapping Service," 2009.

Cisco Systems, Inc., "White Paper—New Cisco Technologies Help Customers Achieve Regulatory Compliance," 1992-2008.

Cisco Systems, Inc., "A Cisco Guide to Defending Against Distributed Denial of Service Attacks," May 3, 2016, 34 pages.

Cisco Systems, Inc., "Cisco Application Visibility and Control," Oct. 2011, 2 pages.

Cisco Systems, Inc., "Cisco Tetration Platform Data Sheet", Updated Mar. 5, 2018, 21 pages.

Cisco Technology, Inc., "Cisco Lock-and-Key:Dynamic Access Lists," http://www/cisco.com/c/en/us/support/docs/security-vpn/lock-key/7604-13.html; Updated Jul. 12, 2006, 16 pages.

Di Lorenzo, Guisy, et al., "EXSED: An Intelligent Tool for Exploration of Social Events Dynamics from Augmented Trajectories," Mobile Data Management (MDM), pp. 323-330, Jun. 3-6, 2013.

Duan, Yiheng, et al., Detective: Automatically Identify and Analyze Malware Processes in Forensic Scenarios via DLLs, IEEE ICC 2015—Next Generation Networking Symposium, pp. 5691-5696.

Feinstein, Laura, et al., "Statistical Approaches to DDoS Attack Detection and Response," Proceedings of the DARPA Information Survivability Conference and Exposition (DISCEX '03), Apr. 2003, 12 pages.

George, Ashley, et al., "NetPal: A Dynamic Network Administration Knowledge Base," 2008, pp. 1-14.

Goldsteen, Abigail, et al., "A Tool for Monitoring and Maintaining System Trustworthiness at Run Time," REFSQ (2015), pp. 142-147.

Hamadi, S., et al., "Fast Path Acceleration for Open vSwitch in Overlay Networks," Global Information Infrastructure and Net-

(56) References Cited

OTHER PUBLICATIONS working Symposium (GIIS), Montreal, QC, pp. 1-5, Sep. 15-19, 2014.
Heckman, Sarah, et al., "On Establishing a Benchmark for Evaluating Static Analysis Alert Prioritization and Classification Techniques," IEEE, 2008; 10 pages.
Hewlett-Packard, "Effective use of reputation intelligence in a security operations center," Jul. 2013, 6 pages.
Hideshima, Yusuke, et al., "STARMINE: A Visualization System for Cyber Attacks," https://www.researchgate.net/publication/221536306, Feb. 2006, 9 pages.
Huang, Hing-Jie, et al., "Clock Skew Based Node Identification in Wireless Sensor Networks," IEEE, 2008, 5 pages.
InternetPerils, Inc., "Control Your Internet Business Risk," 2003-2015, https://www.internetperils.com.
Ives, Herbert, E., et al., "An Experimental Study of the Rate of a Moving Atomic Clock," Journal of the Optical Society of America, vol. 28, No. 7, Jul. 1938, pp. 215-226.
Janoff, Christian, et al., "Cisco Compliance Solution for HIPAA Security Rule Design and Implementation Guide," Cisco Systems, Inc., Updated Nov. 14, 2015, part 1 of 2, 350 pages.
Janoff, Christian, et al., "Cisco Compliance Solution for HIPAA Security Rule Design and Implementation Guide," Cisco Systems, Inc., Updated Nov. 14, 2015, part 2 of 2, 588 pages.
Kerrison, Adam, et al., "Four Steps to Faster, Better Application Dependency Mapping—Laying the Foundation for Effective Business Service Models," BMCSoftware, 2011.
Kim, Myung-Sup, et al. "A Flow-based Method for Abnormal Network Traffic Detection, " IEEE, 2004, pp. 599-612.
Kraemer, Brian, "Get to know your data center with CMDB," TechTarget, Apr. 5, 2006, http://searchdatacenter.techtarget.com/news/118820/Get-to-know-your-data-center-with-CMDB.
Lab Sku, "VMware Hands-on Labs—HOL-SDC-1301" Version: 20140321-160709, 2013; http://docs.hol.vmware.com/HOL-2013/holsdc-1301_html_en/ (part 1 of 2).
Lab Sku, "VMware Hands-on Labs—HOL-SDC-1301" Version: 20140321-160709, 2013; http://docs.hol.vmware.com/HOL-2013/holsdc-1301_html_en/ (part 2 of 2).
Lachance, Michael, "Dirty Little Secrets of Application Dependency Mapping," Dec. 26, 2007.
Landman, Yoav, et al., "Dependency Analyzer," Feb. 14, 2008, http://jfrog.com/confluence/display/DA/Home.
Lee, Sihyung, "Reducing Complexity of Large-Scale Network Configuration Management," Ph.D. Dissertation, Carniege Mellon University, 2010.
Li, Ang, et al., "Fast Anomaly Detection for Large Data Centers," Global Telecommunications Conference (GLOBECOM 2010, Dec. 2010, 6 pages.
Li, Bingbong, et al, "A Supervised Machine Learning Approach to Classify Host Roles on Line Using sFlow," in Proceedings of the first edition workshop on High performance and programmable networking, 2013, ACM, New York, NY, USA, 53-60.
Liu, Ting, et al., "Impala: A Middleware System for Managing Autonomic, Parallel Sensor Systems," In Proceedings of the Ninth ACM SIGPLAN Symposium on Principles and Practice of Parallel Programming(PPoPP '03), ACM, New York, NY, USA, Jun. 11-13, 2003, pp. 107-118.
Lu, Zhonghai, et al., "Cluster-based Simulated Annealing for Mapping Cores onto 2D Mesh Networks on Chip," Design and Diagnostics of Electronic Circuits and Systems, pp. 1, 6, 16-18, Apr. 2008.
Matteson, Ryan, "Depmap: Dependency Mapping of Applications Using Operating System Events: a Thesis," Master's Thesis, California Polytechnic State University, Dec. 2010.
Natarajan, Arun, et al., "NSDMiner: Automated Discovery of Network Service Dependencies," Institute of Electrical and Electronics Engineers INFOCOM, Feb. 2012, 9 pages.

Navaz, A.S. Syed, et al., "Entropy based Anomaly Detection System to Prevent DDoS Attacks in Cloud," International Journal of computer Applications (0975-8887), vol. 62, No. 15, Jan. 2013, pp. 42-47.
Neverfail, "Neverfail IT Continuity Architect," 2015, https://web.archive.org/web/20150908090456/http://www.neverfailgroup.com/products/it-conttinuity-architect.
Nilsson, Dennis K., et al., "Key Management and Secure Software Updates in Wireless Process Control Environments," In Proceedings of the First ACM Conference on Wireless Network Security (WiSec '08), ACM, New York, NY, USA, Mar. 31-Apr. 2, 2008, pp. 100-108.
Nunnally, Troy, et al., "P3D: A Parallel 3D Coordinate Visualization for Advanced Network Scans," IEEE 2013, Jun. 9-13, 2013, 6 pages.
O'Donnell, Glenn, et al., "The CMDB Imperative: How to Realize the Dream and Avoid the Nightmares," Prentice Hall, Feb. 19, 2009.
Ohta, Kohei, et al., "Detection, Defense, and Tracking of Internet-Wide Illegal Access in a Distributed Manner," 2000, pp. 1-16.
Pathway Systems International Inc., "How Blueprints does Integration," Apr. 15, 2014, 9 pages, http://pathwaysystems.com/company-blog/.
Pathway Systems International Inc., "What is Blueprints?" 2010-2016, http://pathwaysystems.com/blueprints-about/.
Popa, Lucian, et al., "Macroscope: End-Point Approach to Networked Application Dependency Discovery," CoNEXT'09, Dec. 1-4, 2009, Rome, Italy, 12 pages.
Prasad, K. Munivara, et al., "An Efficient Detection of Flooding Attacks to Internet Threat Monitors (ITM) using Entropy Variations under Low Traffic," Computing Communication & Networking Technologies (ICCCNT '12), Jul. 26-28, 2012, 11 pages.
Sachan, Mrinmaya, et al., "Solving Electrical Networks to incorporate Supervision in Random Walks," May 13-17, 2013, pp. 109-110.
Sammarco, Matteo, et al., "Trace Selection for Improved WLAN Monitoring," Aug. 16, 2013, pp. 9-14.
Shneiderman, Ben, et al., "Network Visualization by Semantic Substrates," Visualization and Computer Graphics, vol. 12, No. 5, pp. 733,740, Sep.-Oct. 2006.
Thomas, R., "Bogon Dotted Decimal List," Version 7.0, Team Cymru NOC, Apr. 27, 2012, 5 pages.
Wang, Ru, et al., "Learning directed acyclic graphs via bootstarp aggregating," 2014, 47 pages, http://arxiv.org/abs/1406.2098.
Wang, Yongjun, et al., "A Network Gene-Based Framework for Detecting Advanced Persistent Threats," Nov. 2014, 7 pages.
Witze, Alexandra, "Special relativity aces time trial, 'Time dilation' predicted by Einstein confirmed by lithium ion experiment," Nature, Sep. 19, 2014, 3 pages.
Woodberg, Brad, "Snippet from Juniper SRX Series" Jun. 17, 2013, 1 page, O'Reilly Media, Inc.
Zatrochova, Zuzana, "Analysis and Testing of Distributed NoSQL Datastore Riak," Spring, 2015, 76 pages.
Zhang, Yue, et al., "CANTINA: A Content-Based Approach to Detecting Phishing Web Sites," May 8-12, 2007, pp. 639-648.
Al-Fuqaha, Ala, et al., "Internet of Things: A Survey on Enabling Technologies, Protocols, and Applications," IEEE Communication Surveys & Tutorials. vol. 17, No. 4, Nov. 18, 2015, pp. 2347-2376.
Baek, Kwang-Hyun, et al., "Preventing Theft of Quality of Service on Open Platforms," 2005 Workshop of the 1st International Conference on Security and Privacy for Emerging Areas in Communication Networks, 2005, 12 pages.
Brocade Communications Systems, Inc., "Chapter 5—Configuring Virtual LANs (VLANs)," Jun. 2009, 38 pages.
Cisco Systems, Inc. "Cisco, Nexus 3000 Series NX-OS Release Notes, Release 5.0(3)U3(1)," Feb. 29, 2012, Part No. OL-26631-01, 16 pages.
Cisco Systems, Inc., "Cisco—VPN Client User Guide for Windows," Release 4.6, Aug. 2004, 148 pages.
Cisco Systems, Inc., "Cisco 4710 Application Control Engine Appliance Hardware Installation Guide," Nov. 2007, 66 pages.
Cisco Systems, Inc., "Cisco Data Center Network Architecture and Solutions Overview," Feb. 2006, 19 pages.

(56) References Cited

OTHER PUBLICATIONS

Cisco Systems, Inc., "Cisco IOS Configuration Fundamentals Configuration Guide: *Using Autoinstall and Setup*,"Release 12.2, first published Apr. 2001, last updated Sep. 2003, 32 pages.
Cisco Systems, Inc., "Cisco VN-Link: Virtualization-Aware Networking," White Paper, Mar. 2009, 10 pages.
Cisco Systems, Inc., "Cisco, Nexus 5000 Series and Cisco Nexus 2000 Series Release Notes, Cisco NX-OS Release 5.1(3)N2(1b), NX-OS Release 5.1(3)N2(1a) and NX-OS Release 5.1(3)N2(1)," Sep. 5, 2012, Part No. OL-26652-03 CO, 24 pages.
Cisco Systems, Inc., "Nexus 3000 Series NX-OS Fundamentals Configuration Guide, Release 5.0(3)U3(1): *Using PowerOn Auto Provisioning*," Feb. 29, 2012, Part No. OL-26544-01, 10 pages.
Cisco Systems, Inc., "Quick Start Guide, Cisco ACE 4700 Series Application Control Engine Appliance," Software Ve740rsion A5(1.0), Sep. 2011, 138 pages.
Cisco Systems, Inc., "Routing and Bridging Guide, Cisco ACE Application Control Engine," Software Version A5(1.0), Sep. 2011, 248 pages.
Cisco Systems, Inc., "VMWare and Cisco Virtualization Solution: Scale Virtual Machine Networking," Jul. 2009, 4 pages.
Cisco Systems, Inc., "Cisco Remote Integrated Service Engine for Citrix NetScaler Appliances and Cisco Nexus 7000 Series Switches Configuration Guide," Last modified Apr. 29, 2014, 78 pages.
Cisco Systems, Inc., "Cisco Application Control Engine (ACE) Troubleshooting Guide—Understanding the ACE Module Architecture and Traffic Flow," Mar. 11, 2011, 6 pages.
Costa, Raul, et al., "An Intelligent Alarm Management System for Large-Scale Telecommunication Companies," In Portuguese Conference on Artificial Intelligence, Oct. 2009, 14 pages.
De Carvalho, Tiago Filipe Rodrigues, "Root Cause Analysis in Large and Complex Networks," Dec. 2008, Repositorio.ul.pt, pp. 1-55.
Foundation for Intelligent Physical Agents, "FIPA Agent Message Transport Service Specification," Dec. 3, 2002, http://www.fipa.org; 15 pages.
Gia, Tuan Nguyen, et al., "Fog Computing in Healthcare Internet of Things: A Case Study on ECG Feature Extraction," 2015 IEEE International Conference on Computer and Information Technology; Ubiquitous Computing and Communications; Dependable, Autonomic and Secure Computing; Pervasive Intelligence and Computing, Oct. 26, 2015, pp. 356-363.
Joseph, Dilip, et al., "Modeling Middleboxes," IEEE Network, Sep./Oct. 2008, pp. 20-25.
Kent, S., et al. "Security Architecture for the Internet Protocol," Network Working Group, Nov. 1998, 67 pages.
Online Collins English Dictionary, 1 page (Year: 2018).
Theodorakopoulos, George, et al., "On Trust Models and Trust Evaluation Metrics for Ad Hoc Networks," IEEE Journal on Selected Areas in Communications. vol. 24, Issue 2, Feb. 2006, pp. 318-328.
Voris, Jonathan, et al., "Bait and Snitch: Defending Computer Systems with Decoys," Columbia University Libraries, Department of Computer Science, 2013, pp. 1-25.
Zeng, Sai, et al., "Managing Risk in Multi-node Automation of Endpoint Management," 2014 IEEE Network Operations and Management Symposium (NOMS), 2014, 6 pages.

* cited by examiner

DIAGNOSTIC NETWORK VISUALIZATION

TECHNICAL FIELD

The present technology pertains to networking tools, and more specifically to network visualization tools for network management and administration.

BACKGROUND

The ubiquity of computing devices and our growing reliance on network data has created enormous demands for network managers. In particular, network managers must constantly monitor their networks to detect and troubleshoot potential problems. Failure to detect and troubleshoot a network problem in a timely fashion can result in connection errors and unacceptable downtime. Yet as networks grow in size and complexity, it becomes increasingly difficult to adequately track and monitor network usage and statistics in order to promptly react to network problems as they emerge. In many cases, the sheer volume of data and statistics generated in a network can be almost impossible to sort through and analyze.

To this end, various tools have been created to provide various representations of network data and statistics to network managers, which network managers can use to monitor and troubleshoot a network. Typically, current solutions present network data and statistics in table or topology format. For example, network statistics are often collected and presented in a table which the network manager can sort through to detect abnormalities. In other cases, the topology of the network is represented in a graphical tool with copious amounts of statistics displayed within the depicted network. Unfortunately, current solutions are cumbersome and inefficient precisely because they represent excessively large volumes of data in ways that are hard to analyze and digest. Consequently, such tools can quickly overwhelm network managers. As a result, network managers often overlook useful and important details which are generally buried within large amounts of data. Not surprisingly, without effective network visualization and monitoring tools, network managers are limited in their ability to maximize network performance and reliability.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
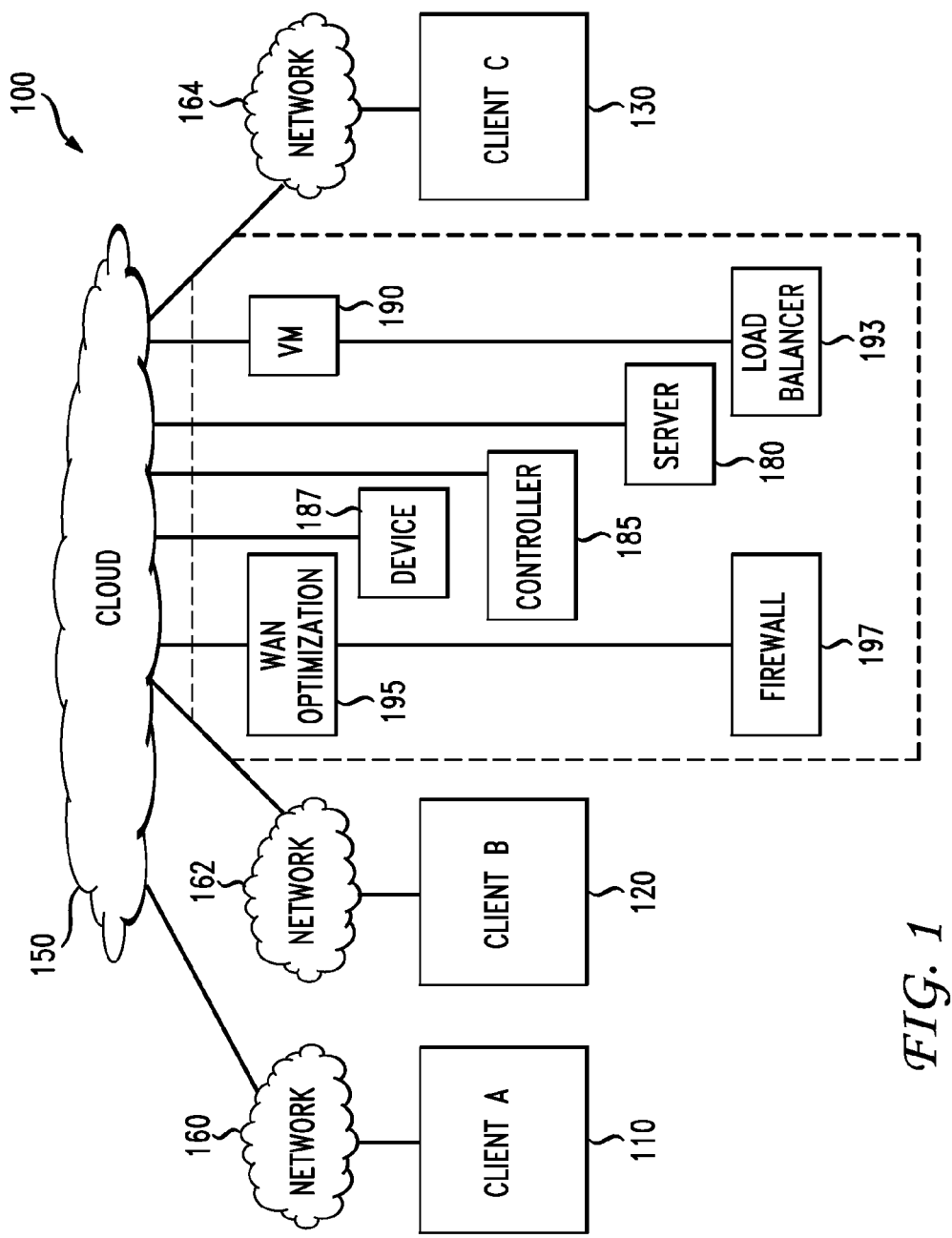
FIG. 1 illustrates a schematic block diagram of an example cloud architecture including nodes/devices interconnected by various methods of communication.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The approaches set forth herein can be used to generate network visualization tools which greatly reduce the complexity of the network and connections and provide a comprehensive picture of the network and the network conditions. The network visualization tool can reduce the complexity of the network by depicting data within layered rings. The network visualization tools allow the state of the system or network to be visualized in a user-friendly manner so the user can better interpret the issues facing the network. In some cases, the visualization can be divorced from the physical connections. Moreover, the visualization may include representations of logical connections in a network, such as a software-defined network environment. The graphical user interface (GUI) can highlight specific problems and conditions and may be tuned to specific applications and/or environments. The layout of the information in the GUI can limit the complexity of the data without losing important details.

Disclosed are systems, methods, and computer-readable storage media for network visualization tools. A system can analyze network traffic associated with network elements and generate a graphical user interface (GUI). In some embodiments, the GUI can display a first set of graphical segments representing the network elements. The first set of graphical segments can be contiguously arranged in a first graphical structure. Moreover, each of the first set of graphical segments can represent a respective category of network elements and/or indicate a respective number of network elements in the respective category.

The GUI can also display a second set of graphical segments representing the network traffic. The second set of graphical segments can be contiguously arranged in a second graphical structure. Each of the second set of graphical segments can also represent a specific type of network traffic associated with respective network elements from the network elements and/or indicate an amount of network traffic associated with the specific type of network traffic.

In addition, the GUI can display one or more visual indications representing respective amounts of network traffic for each specific type of network traffic and/or a total amount of bandwidth between the collector engine and a remote destination. For example, the GUI can display a first visual indication representing respective amounts of network traffic for each specific type of network traffic, and a second visual indication representing a total amount of bandwidth between the collector engine and the remote destination.

In some cases, the first and second graphical structures can be one or more specific geometric shapes and can be depicted according to a specific relationship, arrangement, alignment, order, or placement. For example, in some embodiments, the first and second graphical structures can be rings, which can be open or closed circles. In some cases, the first graphical structure can be a ring, such as an outer ring, and the second graphical structure can be an inner or concentric ring. Thus, the second graphical structure can be a ring within a second ring represented by the first graphical structure. In other embodiments, the first and/or second graphical structures can represent other shapes and relationships. For example, the first and second graphical structures can represent layers in a larger pyramid or triangle structure, contiguous layers or squares in a container, boxes, overlapping shapes, etc.

Description

A computer network can include a system of hardware, software, protocols, and transmission components that collectively allow separate devices to communicate, share data, and access resources, such as software applications. More specifically, a computer network is a geographically distributed collection of nodes interconnected by communication links and segments for transporting data between endpoints, such as personal computers and workstations. Many types of networks are available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a public WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by intermediate network nodes, such as routers, switches, hubs, or access points (Aps), which can effectively extend the size or footprint of the network.

Networks can be segmented into subnetworks to provide a hierarchical, multilevel routing structure. For example, a network can be segmented into subnetworks using subnet addressing to create network segments. This way, a network can allocate various groups of IP addresses to specific network segments and divide the network into multiple logical networks.

In addition, networks can be divided into logical segments called virtual networks, such as VLANs, which connect logical segments. For example, one or more LANs can be logically segmented to form a VLAN. A VLAN allows a group of machines to communicate as if they were in the same physical network, regardless of their actual physical location. Thus, machines located on different physical LANs can communicate as if they were located on the same physical LAN. Interconnections between networks and devices can also be created using routers and tunnels, such as VPN or secure shell (SSH) tunnels. Tunnels can encrypt point-to-point logical connections across an intermediate network, such as a public network like the Internet. This allows secure communications between the logical connections and across the intermediate network. By interconnecting networks, the number and geographic scope of machines interconnected, as well as the amount of data, resources, and services available to users can be increased.

Further, networks can be extended through network virtualization. Network virtualization allows hardware and software resources to be combined in a virtual network. For example, network virtualization can allow multiple numbers of VMs to be attached to the physical network via respective VLANs. The VMs can be grouped according to their respective VLAN, and can communicate with other VMs as well as other devices on the internal or external network.

To illustrate, overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Networks can include various hardware or software appliances or nodes to support data communications, security, and provision services. For example, networks can include routers, hubs, switches, APs, firewalls, repeaters, intrusion detectors, servers, VMs, load balancers, application delivery controllers (ADCs), and other hardware or software appliances. Such appliances can be distributed or deployed over one or more physical, overlay, or logical networks. Moreover, appliances can be deployed as clusters, which can be formed using layer 2 (L2) and layer 3 (L3) technologies. Clusters can provide high availability, redundancy, and load balancing for flows associated with specific appliances or nodes. A flow can include packets that have the same source and destination information. Thus, packets originating from device A to service node B can all be part of the same flow.

Endpoint groups (EPGs) can also be used in a network for mapping applications to the network. In particular, EPGs can use a grouping of application endpoints in a network to apply connectivity and policy to the group of applications. EPGs can act as a container for groups or collections of applications, or application components, and tiers for implementing forwarding and policy logic. EPGs also allow separation of network policy, security, and forwarding from addressing by instead using logical application boundaries.

Appliances or nodes, as well as clusters, can be implemented in cloud deployments. Cloud deployments can be provided in one or more networks to provision computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, network devices, applications, virtual machines (VMs), services, and so forth. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc. Also, services may include various types of services, such as monitoring services, management services, communication services, data services, bandwidth services, routing services, configuration services, wireless services, architecture services, etc.

The cloud may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. In some cases, the cloud can be include one or more cloud controllers which can help manage and interconnect various elements in the cloud as well as tenants or clients connected to the cloud.

Cloud controllers and/or other cloud devices can be configured for cloud management. These devices can be pre-configured (i.e, come "out of the box") with centralized management, layer 7 (L7) device and application visibility, real time web-based diagnostics, monitoring, reporting, management, and so forth. As such, in some embodiments, the cloud can provide centralized management, visibility, monitoring, diagnostics, reporting, configuration (e.g., wireless, network, device, or protocol configuration), traffic distribution or redistribution, backup, disaster recovery, control, and any other service. In some cases, this can be done without the cost and complexity of specific appliances or overlay management software.

Figure 2:
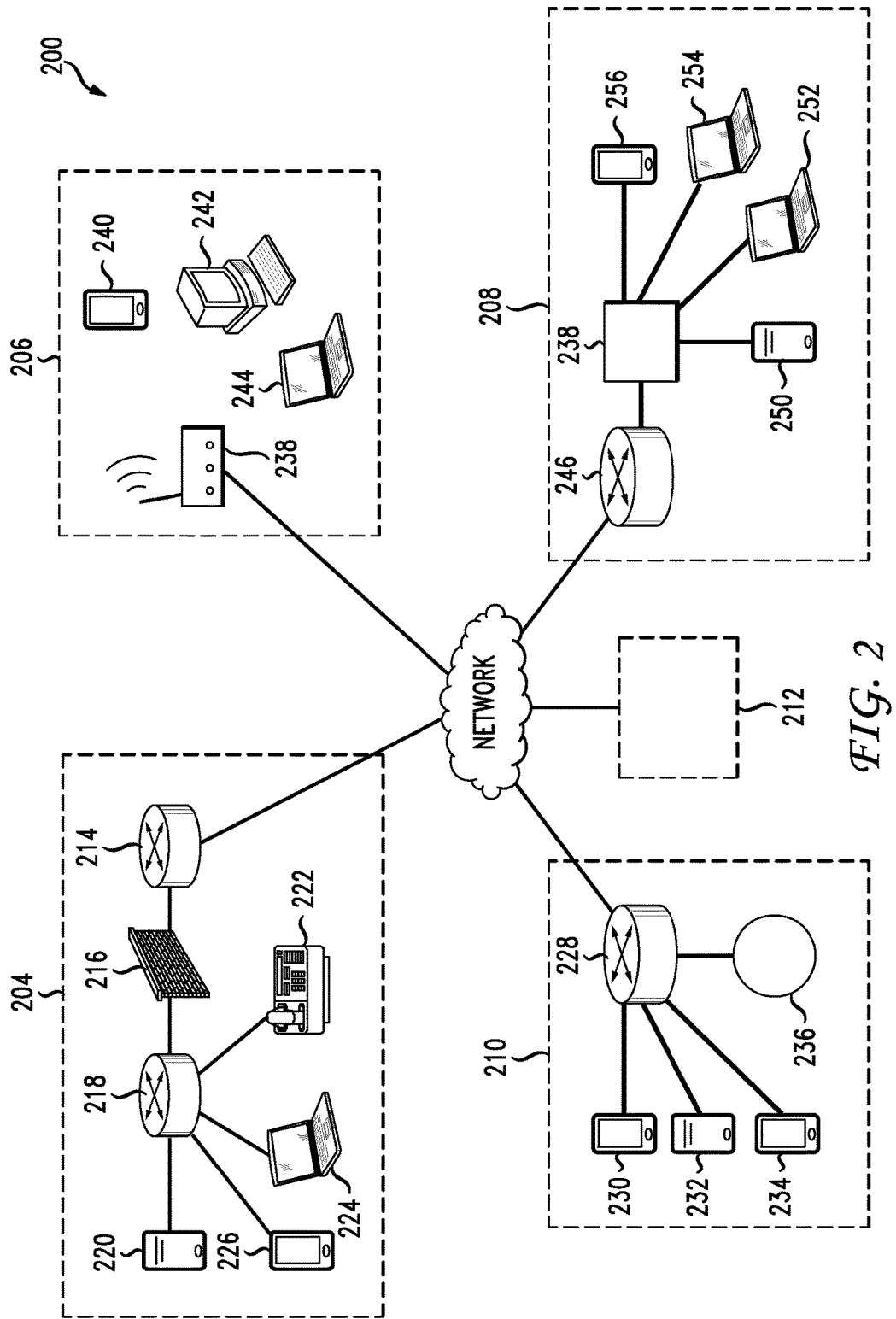
FIG. 2 illustrates a schematic diagram of an example network environment.
Figure 7:
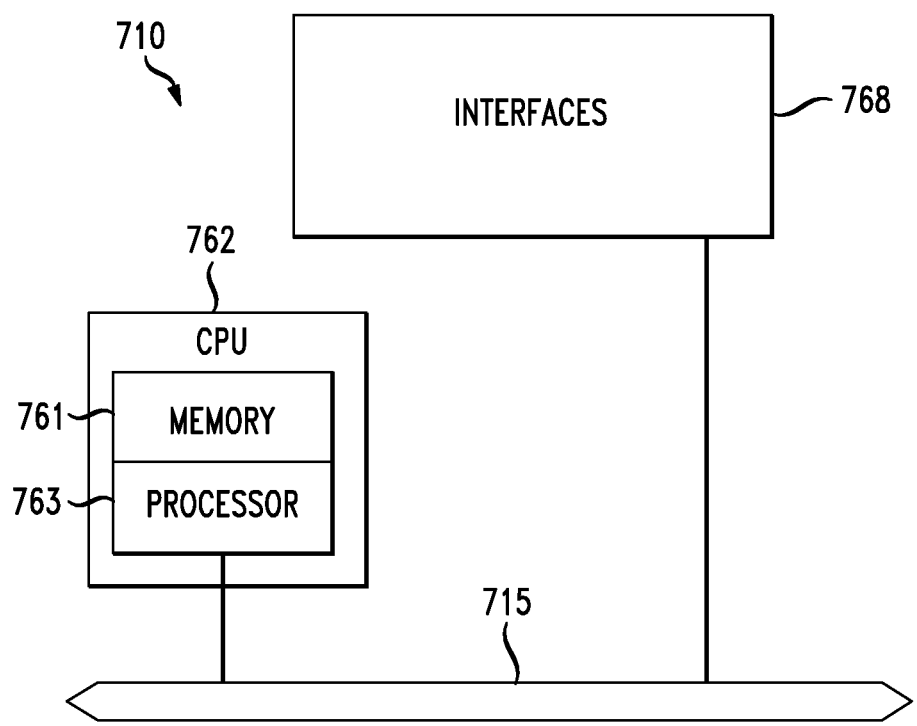
FIG. 7 illustrates an example network device.
Figure 8A:
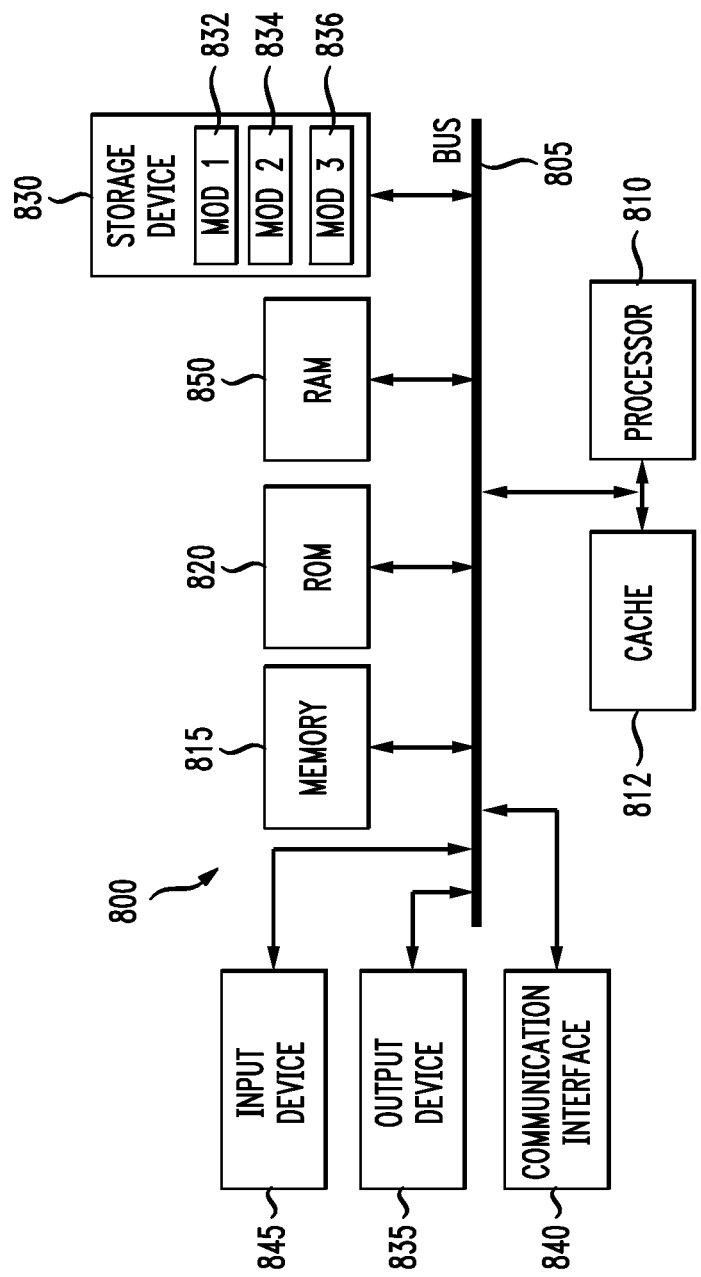
FIGS. 8A and 8B illustrate example system embodiments.
Figure 8B:
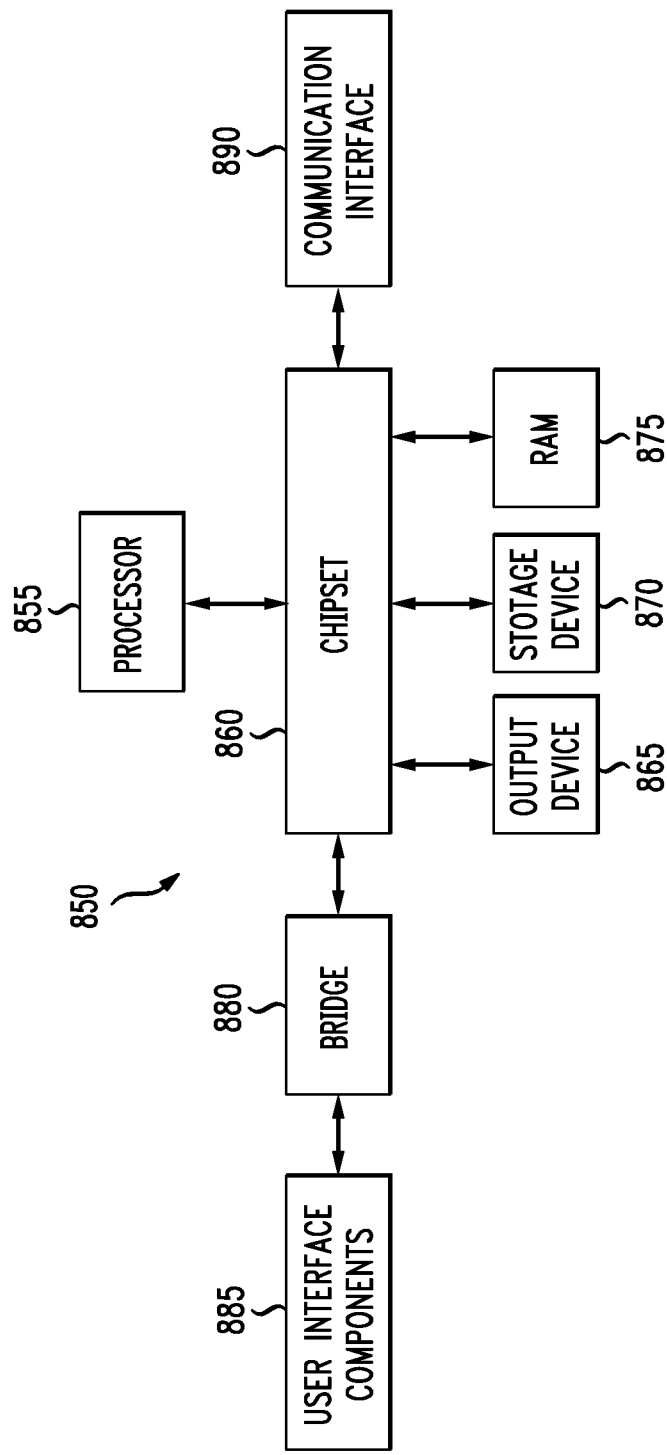

The disclosed technology addresses the need in the art for flexible, effective, and user-friendly network visualization tools. Disclosed are systems, methods, and computer-readable storage media for network visualization. A description of cloud and network computing environments, as illustrated in FIGS. 1 and 2, is first disclosed herein. A discussion of network visualizations tools, as illustrated in FIGS. 3-6, will then follow. The discussion then concludes with a brief description of example devices, as illustrated in FIGS. 7 and 8A-B. These variations shall be described herein as the various embodiments are set forth. The disclosure now turns to FIG. 1.

FIG. 1 illustrates a schematic block diagram of an example cloud architecture 100 including nodes/devices interconnected by various methods of communication. Cloud 150 can be a public, private, and/or hybrid cloud system. Cloud 150 can include resources, such as one or more Firewalls 197; Load Balancers 193; WAN optimization platforms 195; devices 187, such as switches, routers, intrusion detection systems, Auto VPN systems, or any hardware or software network device; servers 180, such as dynamic host configuration protocol (DHCP), domain naming system (DNS), or storage servers; virtual machines (VMs) 190; controllers 200, such as a cloud controller or a management device; or any other resource.

Cloud resources can be physical, software, virtual, or any combination thereof. For example, a cloud resource can include a server running one or more VMs or storing one or more databases. Moreover, cloud resources can be provisioned based on requests (e.g., client or tenant requests), schedules, triggers, events, signals, messages, alerts, agreements, necessity, or any other factor. For example, the cloud 150 can provision application services, storage services, management services, monitoring services, configuration services, administration services, backup services, disaster recovery services, bandwidth or performance services, intrusion detection services, VPN services, or any type of services to any device, server, network, client, or tenant.

In addition, cloud 150 can handle traffic and/or provision services. For example, cloud 150 can provide configuration services, such as auto VPN, automated deployments, automated wireless configurations, automated policy implementations, and so forth. In some cases, the cloud 150 can collect data about a client or network and generate configuration settings for specific service, device, or networking deployments. For example, the cloud 150 can generate security policies, subnetting and routing schemes, forwarding schemes, NAT settings, VPN settings, and/or any other type of configurations. The cloud 150 can then push or transmit the necessary data and settings to specific devices or components to manage a specific implementation or deployment. For example, the cloud 150 can generate VPN settings, such as IP mappings, port number, and security information, and send the VPN settings to specific, relevant device(s) or component(s) identified by the cloud 150 or otherwise designated. The relevant device(s) or component(s) can then use the VPN settings to establish a VPN tunnel according to the settings. As another example, the cloud 150 can generate and manage high availability and failover settings, as will be described below with reference to FIG. 3.

To further illustrate, cloud 150 can provide specific services for client A (110), client B (120), and client C (130). For example, cloud 150 can deploy a network or specific network components, configure links or devices, automate services or functions, or provide any other services for client A (110), client B (120), and client C (130). Other non-limiting example services by cloud 150 can include network administration services, network monitoring services, content filtering services, application control, WAN optimization, firewall services, gateway services, storage services, protocol configuration services, wireless deployment services, and so forth.

To this end, client A (110), client B (120), and client C (130) can connect with cloud 150 through networks 160, 162, and 164, respectively. More specifically, client A (110), client B (120), and client C (130) can each connect with cloud 150 through networks 160, 162, and 164, respectively, in order to access resources from cloud 150, communicate with cloud 150, or receive any services from cloud 150. Networks 160, 162, and 164 can each refer to a public network, such as the Internet; a private network, such as a LAN; a combination of networks; or any other network, such as a VPN or an overlay network.

Moreover, client A (110), client B (120), and client C (130) can each include one or more networks. For example, (110), client B (120), and client C (130) can each include one or more LANs and VLANs. In some cases, a client can represent one branch network, such as a LAN, or multiple branch networks, such as multiple remote networks. For example, client A (110) can represent a single LAN network or branch, or multiple branches or networks, such as a branch building or office network in Los Angeles and another branch building or office network in New York. If a client includes multiple branches or networks, the multiple branches or networks can each have a designated connection to the cloud 150. For example, each branch or network can maintain a tunnel to the cloud 150. Alternatively, all branches or networks for a specific client can connect to the cloud 150 via one or more specific branches or networks. For example, traffic for the different branches or networks of a client can be routed through one or more specific branches or networks. Further, client A (110), client B (120), and client C (130) can each include one or more routers, switches, appliances, client devices, VMs, or any other devices. In some cases, client A (110), client B (120), and/or client C (130) can include primary and secondary appliances, as illustrated in FIG. 3. Each client can also maintain links between branches. For example, client A can have two branches, and the branches can maintain a link between each other.

In some cases, branches can maintain a tunnel between each other, such as a VPN tunnel. Moreover, the link or tunnel between branches can be generated and/or maintained by the cloud 150. For example, the cloud 150 can collect network and address settings for each branch and use those settings to establish a tunnel between branches. In some cases, the branches can use a respective tunnel between the respective branch and the cloud 150 to establish the tunnel between branches. For example, branch 1 can communicate with cloud 150 through a tunnel between branch 1 and cloud 150 to obtain the settings for establishing a tunnel between branch 1 and branch 2. Branch 2 can similarly communicate with cloud 150 through a tunnel between branch 2 and cloud 150 to obtain the settings for the tunnel between branch 1 and branch 2.

In some cases, cloud 150 can maintain information about each client network, in order to provide or support specific services for each client, such as failover or auto VPN services as further described below in FIG. 3. Cloud 150 can also maintain one or more links or tunnels to client A (110), client B (120), and client C (130). For example, cloud 150 can maintain a VPN tunnel to one or more devices in client A's network. In some cases, cloud 150 can configure the VPN tunnel for a client, maintain the VPN tunnel, or automatically update or establish any link or tunnel to the client or any devices of the client.

The cloud 150 can also monitor device and network health and status information for client A (110), client B (120), and client C (130). To this end, client A (110), client B (120), and client C (130) can synchronize information with cloud 150. Cloud 150 can also manage and deploy services for client A (110), client B (120), and client C (130). For example, cloud 150 can collect network information about client A and generate network and device settings to automatically deploy a service for client A. In addition, cloud 150 can update device, network, and service settings for client A (110), client B (120), and client C (130). For example, cloud 150 can send instructions to client A to trigger a device to change from failover mode to live mode, as further described below.

Those skilled in the art will understand that the cloud architecture 150 can include any number of nodes, devices, links, networks, or components. In fact, embodiments with different numbers and/or types of clients, networks, nodes, cloud components, servers, software components, devices, virtual or physical resources, configurations, topologies, services, appliances, deployments, or network devices are also contemplated herein. Further, cloud 150 can include any number or type of resources, which can be accessed and utilized by clients or tenants. The illustration and examples provided herein are for clarity and simplicity.

Moreover, as far as communications within the cloud architecture 100, packets (e.g., traffic and/or messages) can be exchanged among the various nodes and networks in the cloud architecture 100 using specific network communication protocols. In particular, packets can be exchanged using wired protocols, wireless protocols, or any other protocols. Some non-limiting examples of protocols can include protocols from the Internet Protocol Suite, such as TCP/IP; OSI (Open Systems Interconnection) protocols, such as L1-L7 protocols; routing protocols, such as RIP, IGP, BGP, STP, ARP, OSPF, EIGRP, NAT; or any other protocols or standards, such as HTTP, SSH, SSL, RTP, FTP, SMTP, POP, PPP, NNTP, IMAP, Telnet, SSL, SFTP, WIFI, Bluetooth, VTP, ISL, IEEE 802 standards, L2TP, IPSec, etc. In addition, various hardware and software components or devices can be implemented to facilitate communications both within a network and between networks. For example, switches, hubs, routers, access points (APs), antennas, network interface cards (NICs), modules, cables, firewalls, servers, repeaters, sensors, etc.

FIG. 2 illustrates a schematic diagram of an example network environment 200. The network environment 200 can include a network 202 which can be used by devices and/or other network(s) to communicate. The network 202 can include a public network, such as the Internet; a private network, such as a LAN; or a combination of public and/or private networks.

Networks 204-210 can communicate with each other through network 202. Networks 204-210 can be specific branches or networks of a larger network, or separate networks altogether. Moreover, the networks 204-210 can be physical networks, virtual networks, or a combination of physical and virtual networks. In addition, networks 204-210 can communicate with a cloud, such as cloud 150, through the network 202. In some cases, a specific network from the networks 204-210 can include a tunnel, such as a VPN tunnel, to another network from the networks 204-210. This allows the specific network to maintain a connection with a remote network. The tunnel can go through the network 202 and/or any other network. In some cases, a specific network can include multiple tunnels to different networks. For example, network 204 may maintain a tunnel to network 206 and another tunnel to network 208. In yet other cases, a specific network can have a tunnel to the cloud 150. This way, the specific network can maintain a connection with the cloud 150. The networks 204-210 can transmit data, such as settings or statistics, to another network or a cloud through a tunnel.

The networks 204-210 can include devices 214-256 which can be interconnected to communicate within the networks 204-210 and/or external networks, such as network 202. For example, network 204 can include client devices 222-226 connected through a switch 218. The client devices 222-226 can include any device, such as a laptop, a tablet computer, a smartphone, a conference phone, a desktop computer, a network printer, a smart television, a gaming system, a GPS system, a network interface device, etc. The network 204 can also include a server 220, which can be configured to provision services, for example. The switch 218 can manage communications within the network 204. The switch 218 can be a physical switch or a virtual switch running on a virtual machine, for example. The network 204 can also include a firewall 216 to provide security by filtering communications to and from the network 204. The firewall 216 can be a physical firewall or a virtual firewall service or appliance. The firewall 216 can connect to a router 214, which can be a physical or virtual router. The router 214 can connect the network 204 to other network or devices, such as network 202 and/or networks 206-210.

Similarly, network 206 can include client devices 240-244. The client devices 240-244 can communicate via a wireless network device 238. The wireless network device can be, for example, a wireless router. The wireless network device 238 can connect network 206 with network 202. Through network 202, network 206 can also communicate with network 204 and 208-210.

Network 208 can connect with network 202 and networks 204-106 and 210 through router 246. Client devices 250-256 can connect to router 246 through network device 248. Network device 248 can be any L2 and/or L3 device. For example, network device 248 can be a switch. In some embodiments, network device 248 can also run and provision one or more services or applications to the client devices 250-256. For example, in some cases, network device 248 can run a virtual appliance, such as a firewall, a web security appliance, a content-filtering appliance, a proxy, a context directory engine, a load balancing appliance, a monitoring appliance, a remote access appliance, or any other appliance.

Network 210 can connect to network 202 and networks 204-208 through router 228. Client devices 230-234 can connect to router 228 in order to communicate with other devices outside of network 210, or any devices within network 210 that have different VLAN memberships, endpoint groups, subnets, or reside on different physical or virtual network segments. Client devices 230-234 can connect to router 228 directly. However, in some cases, client devices 230-234 can connect to router 228 indirectly through one or more other network devices, such as one or more switches. Appliance 236 can also connect to router 228 in order to provide configured services to network 210. Appliance 236 can be any physical or virtual device, application, or server. For example, appliance 236 can be a physical storage server or a virtual monitoring appliance, for example. Other non-limiting examples of appliances include, but are not limited to, a proxy, a context directory agent, a web security appliance, a firewall, a content filtering engine, a security gateway, an identity services engine, an access or mobility services appliance, a remote access appliance, an adaptive security appliance, a conferencing appliance, etc.

Collector engine 212 can collect data statistics from networks 204-210 and/or any of the devices 214-256; detect events from networks 204-210 and/or any of the devices 214-256, such as device or network failures, configuration changes, status changes, etc.; monitor networks 204-210, one or more devices 214-256, and/or traffic associated with any of the devices 214-256; monitor security for networks 204-210 and/or any of the devices 214-256; track and/or analyze data flows associated with networks 204-210 and/or any of the devices 214-256; collect or analyze traffic characteristics, such as class of service, latency, jitter; analyze network conditions, such as bandwidth, congestion, etc.; perform tests for networks 204-210 and/or any of the devices 214-256; store or collect logging events from networks 204-210 and/or any of the devices 214-256; collect or maintain configuration settings for networks 204-210 and/or any of the devices 214-256; collect status information for services running on networks 204-210 and/or any of the devices 214-256; log telemetry data; and so forth. In some cases, collector engine 212 track and monitor network flow or NetFlow applications. The collector engine 212 can collect various types of data, including statistics, attributes, settings, events, conditions, and information. For example, collector engine 212 can collect geolocation information, data flow information, bytes transferred, endpoint status, type of traffic, device or network conditions, bandwidth statistics, event data, packet attributes and statistics, etc.

The collector engine 212 can be a physical and/or virtual device. For example, collector engine 212 can be a server or a virtual appliance running on the server. Further, collector engine 212 can reside on one or more of networks 204-210 or on a separate network. For example, collector engine 212 can reside within a network that encompasses one or more of networks 204-210, or a separate, remote network. In some cases, collector engine 212 can reside on a cloud, such as cloud 150. For example, collector engine 212 can reside on cloud 150 and maintain a connection to networks 204-210 in order to communicate data with networks 204-210. Collector engine 212 can communicate with networks 204-210 and/or any of the devices 214-256 through network 202.

In some embodiments, collector engine 212 can communicate with networks 204-210 through one or more tunnels, such as VPNs, between cloud 150 and networks 204-210. A tunnel can go between cloud 150 and a network, such as network 204, and through network 202 and/or any other network, such as the Internet, for example. In other cases, networks 204-210 can maintain another type of link between networks 204-210 and cloud 150 and/or collector engine 212, with or without using a tunnel.

While FIG. 2 is depicted with a specific number of devices and networks, one of ordinary skill in the art will readily recognize that the number of devices and networks can vary in other cases. For example, other embodiments can include more or less devices and/or networks. Moreover, different types of network topologies and architectures are contemplated herein. For example, FIG. 2 can include overlay networks, SDNs, virtualized topologies, cloud services and implementations, virtual networks, different physical topologies, etc. The specific devices, networks, architecture(s), and topologies in FIG. 2 are provided for the sake of non-limiting, explanation purposes.

FIGS. 3A-J illustrate an example aspects of a graphical tool 300 for network visualization. The graphical tool 300 can be a graphical user interface representing one or more networks, devices, elements, conditions, locations, events, information, topologies, services, and so forth. In some cases, the graphical tool 300 can be an interactive tool, which can allow the user to select elements to modify the output, for example. The graphical tool 300 can be dynamic and/or can update, refresh, and change based on new information, conditions, or circumstances. Moreover, the graphical tool 300 can be based on historical data, current statistics, and/or real-time (or near real-time) information. One or more graphical elements in the graphical tool 300 can be selectable to allow the user to drill down into specific areas or elements, and/or provide more granular details on user-selected items, for example. Further, the graphical tool 300 can also be configured to receive user inputs, such as user selections, queries, and so forth.

Figure 3A:
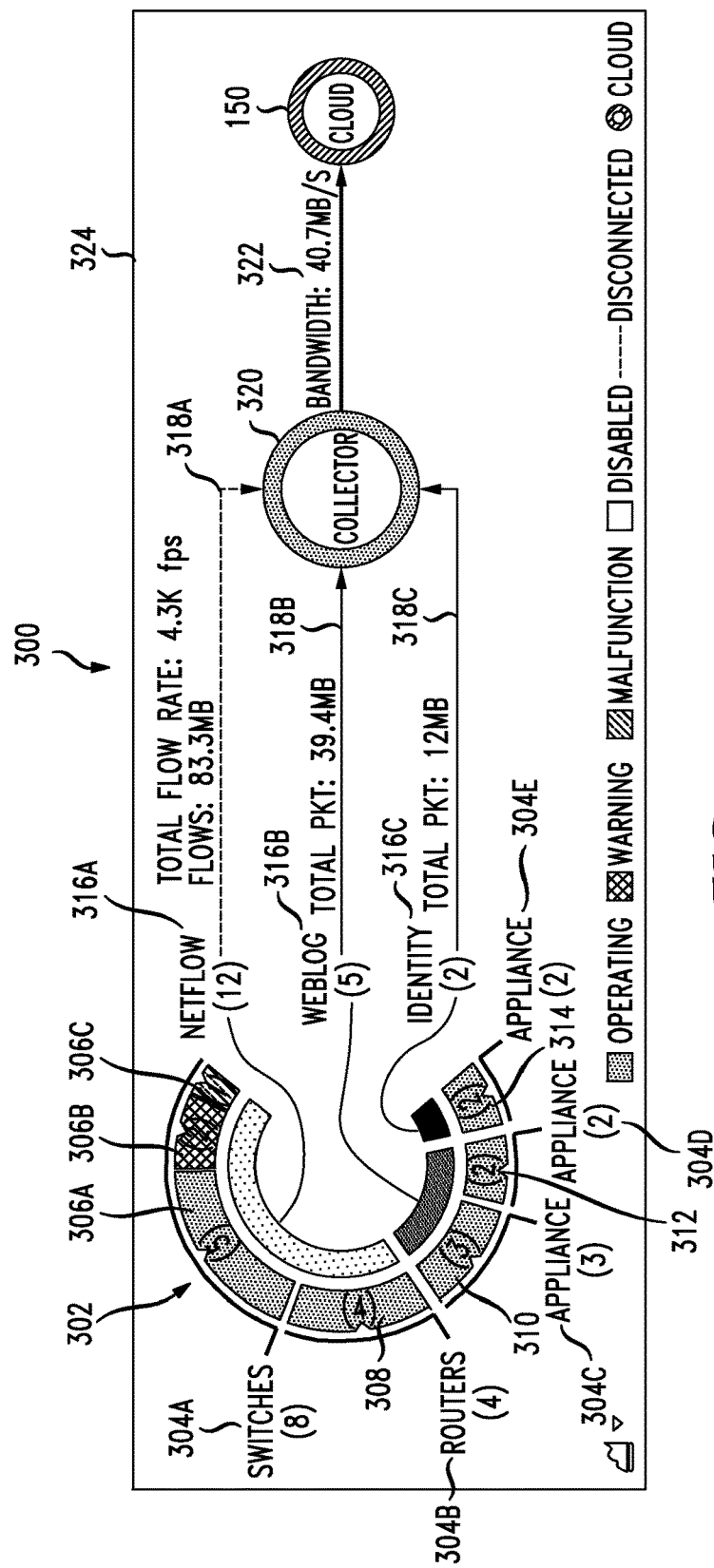
FIGS. 3A-J illustrate a various embodiments of an example graphical tool for network visualization.

FIG. 3A illustrates a full view 324 of the graphical tool 300. In the full view 324, the graphical tool 300 can include a graphical ring 302. The graphical ring 302 can be an open ring or a closed ring. Moreover, the graphical ring 302 can be a circular or semi-circular shape (open or closed), such as a ring, a dial, a circle, a knob, a disc, an arc, a loop, etc. Other geometrical shapes are also contemplated herein, such as an ellipse (open or closed), a round or curved shape, or any other shape.

The graphical ring 302 can include graphical segments 304A-E. Graphical segment 304A can represent switches, such as switches 218 and 248. Graphical segment 304B can represent routers, such as routers 114, 128, 138, and 148. Graphical segments 304C-E can represent specific appliances, such as appliances 116 and 136. For example, graphical segment 304C can represent web security appliances, graphical segment 304D can represent web proxies, and graphical segment 304E can represent context directory agents. In other embodiments, one or more of the graphical segments 304A-E can represent other types of devices, such as servers or firewalls; other types of appliances, such as other types of virtual or cloud-based services or applications; or other types of categories, such as events, conditions, traffic, geographic locations, networks, and so forth.

Moreover, the devices and appliances represented by graphical segments 304A-E can reside in one or more networks, such as networks 204-210. For example, the devices and appliances represented by graphical segments 304A-E can reside in a data center, a corporate network, a campus, one or more specific branch networks, a geographic location, or one or more specific related or unrelated networks. The devices and appliances can also be associated with a specific organization, location, network, or entity; but can otherwise be associated with discrete or unrelated organizations, locations, networks, or entities.

Further, the graphical segments 304A-E can depict information or conditions collected or detected by collector engine 212 for the devices and appliances represented by the graphical segments 304A-E. For example, graphical segment 304A can depict a total number of switches represented by the graphical segment 304A, graphical segment 304B can depict a total number of routers represented by the graphical segment 304B, graphical segments 304C-E can depict a respective total number of appliances represented by each of graphical segments 304C-E. To illustrate, graphical segment 304A can indicate that 8 switches are represented by the graphical segment 304A, graphical segment 304B can indicate that 4 routers are represented by the graphical segment 304B, graphical segment 304C can indicate that it represents 3 appliances, graphical segment 304D can indicate that it represents 2 appliances, and graphical segment 304-E can indicate that it represents 2 appliances.

Graphical segments 304A-E can also be divided into sub-segments representing specific elements within the graphical segments 304A-E having a specific status, event, context, or condition. For example, graphical segment 304A can be divided into sub-segments 306A-C, which can represent specific switches having a specific status or condition. More specifically, graphical segment 304A can include a sub-segment 306A for switches in a normal or operating status, a sub-segment 306B representing switches in a warning status, and a sub-segment 306C representing switches having a malfunction status. The sub-segments 306A-C can also indicate the number of switches in the specific sub-segments 306A-C. For example, sub-segment 306A can indicate 5 switches are in normal or operating status, sub-segment 306B can indicate 2 switches are in warning status, and sub-segment 306C can indicate 1 switch is in malfunction status. The sub-segments 306A-C can also be depicted with specific attributes that are based on the condition they represent. For example, the sub-segments 306A-C can be color-coded based on respective conditions. To illustrate, sub-segment 306A can be green to represent the normal or operating status, sub-segment 306B can be yellow to represent the warning status, and sub-segment 306C can be red to represent the malfunction status. Other attributes or patterns are also contemplated herein, such as other colors, other shades, other indicators, other shapes, other graphical elements, etc.

Further, graphical segments 304A-E and sub-segments 306A-C can be sized based on the number of items in the respective segments or sub-segments. Such sizing can be relative to each other and/or relative to the entire graphical ring 302. This can allow a user to quickly gain perspective into the ratios or proportions of each segment depicted by the graphical ring 302, as well as the item(s) represented by each segment. Moreover, the specific indications, such as the numbering, and attributes, such as the color-coding, used to depict graphical segments 304A-E and sub-segments 306A-C can similarly help a user to quickly obtain an overall picture of the number, types, conditions, and details of the devices and appliances.

The graphical ring 302 can also include a concentric ring made up of concentric segments 316A-C. Segment 316A can represent NetFlow traffic. Segment 316A can also include an indication of the number of elements associated with the NetFlow traffic, and can be proportionally sized based on the total number of elements associated with segment 316A relative to the other elements and items represented by the graphical ring 302. For example, segment 316A can indicate that 12 elements are associated with the NetFlow traffic, and can be sized accordingly. The 12 elements associated with the NetFlow traffic and represented by segment 316A can correspond to the 12 devices (8 switches and 4 routers) associated with segments 304A-B. Thus, segment 316A can be sized according to the combination of segment 304A and 304B, since segment 316A represents the same number of items as the combination of segment 304A and 304B and are thus proportionally equivalent. Segment 316A can also include other graphical attributes and may provide additional representations. For example, segment 316A can include patterns or markings or can be color-coded to depict an attribute, status, condition, event, or feature. As illustrated, segment 316A can be depicted according to a specific pattern which indicates a normal or operating status. Thus, a user can ascertain from the pattern of segment 316A that the NetFlow traffic, represented by segment 316A, has a normal or operating status.

The view 324 of the graphical tool 300 can also include a collector 320. Collector 320 can be a device, such as collector 212 in FIG. 2, or service which collects the data and statistics used to generate the graphical tool 300, including the graphical ring 302. For example, collector 320 can be a server, an appliance, a cluster of servers or appliances, a controller, a network device, etc. Moreover, collector 320 can include an indication of a status associated with collector 320. For example, collector 320 can be depicted to illustrate a status or condition, such as an operating status, a warning status, a malfunction status, a disabled status, etc. The status or condition information can be depicted based on a characteristic or illustration of collector 320. For example, collector 320 can be color-coded based on a current status. As another example, collector 320 can include specific patterns, fills, lines, objects, symbols, characters, flags, shapes, letters, numbers, etc., to indicate a current status.

Collector 320 can reside on one or more networks associated with the devices, services, messages, and/or appliances represented by the graphical ring 302. Alternatively, in some cases, collector 320 can reside in a cloud, such as cloud 150 in FIG. 1, or another remote network, and communicate with the devices, services, and/or appliances represented by the graphical ring 302 via the Internet, for example. Moreover, the collector 320 can communicate with each device, service, and/or appliance represented by the graphical ring 302 in order to collect, track, and/or store data, statistics, and/or traffic details for each device, service, message, and/or appliance represented by the graphical ring 302.

Further, full view 324 can also include links 318A-C between collector 320 and segments 316A-C. The links 318A-C can represent the connection and connection status between collector 320 and respective devices associated with the segments 316A-C. For example, link 318A can indicate a disconnected status between collector 320 and the elements associated with segment 316A (i.e., switches 304A and routers 304B). Link 318B can indicate a normal connection exists between collector 320 and the elements associated with segment 316B (i.e., appliances 304C-D). Link 318C can indicate a normal connection between collector 320 and the elements associated with segment 316C (i.e., appliance 304E).

The links 318A-C can also indicate the total number of packets counted by collector 320 for each type of traffic associated with segments 316A-C. For example, link 318A can indicate the total number of NetFlow packets, which are associated with segment 316A, counted or tracked by collector 320. Link 318B can indicate the total number of web packets, which are associated with segment 316B, counted or tracked by collector 320. Link 318C can indicate the total number of identity packets (e.g., context directory agent traffic), which are associated with segment 316C, counted or tracked by collector 320.

In addition, links 318A-C can include other indications or statistics, such as bandwidth, errors, rates, type of traffic, etc. Moreover, links 318A-C can provide indications regarding details that may be specific to the segment they are associated with. For example, link 318A is associated with segment 316A, which represents NetFlow traffic. Accordingly, link 318A can include details specific to NetFlow traffic or otherwise relevant to NetFlow traffic. For example, link 318A can include indications of flow rate and total flows tracked or collected.

The full view 324 of graphical tool 300 can also include a link 322 between collector 320 and the cloud 150. Link 322 can indicate that a connection exists between collector 320 and the cloud 150. The link 322 can include a graphical indication of the status of the link 322 between collector 320 and the cloud 150. For example, the link 322 can by displayed as a specific type of line between collector 320 and cloud 150 to represent a normal or connected link. Here, the characteristics or features of the line can be selected to indicate the normal connection. For example, a straight line, a weight of the line, a color of the line, a shape of the line, a length of the line, or any other detail can be used to indicate a normal connection. In other cases, a dashed line, a specific weight of the line, a dashed line, a line style, a specific color of the line, or any other details of the line can be used to depict a disconnected status of the link 322, a warning status of the link 322, a disabled status of the link 322, a malfunction status of the link 322, etc.

Link 322 can also include an indication of other details associated with the link 322. For example, the link 322 can indicate the bandwidth of the link 322, the flow rate, the type of traffic, etc. In some embodiments, link 322 can include a label indicating the bandwidth between collector 320 and the cloud 150.

Figure 3B:
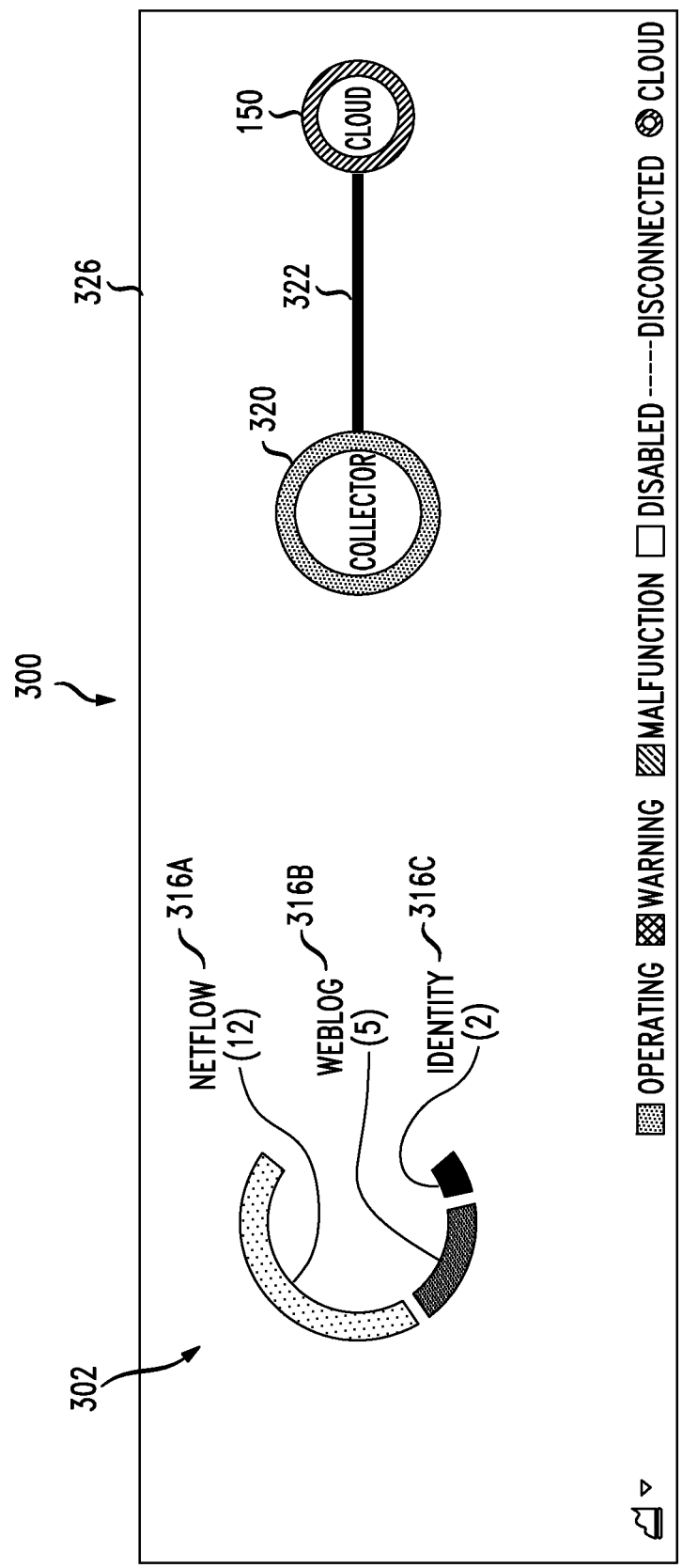

Referring to FIG. 3B, the graphical tool 300 can be adapted based on changing conditions, inputs, and/or preferences. For example, the graphical ring 302 can be depicted with a limited view 326. Limited view 326 can show the segments 316A-C without also showing segments 304A-E. This can allow a user to focus the graphical tool 300 on the segments 316A-E and the elements represented by those segments (i.e., the type of traffic represented by those segments).

In the limited view 326, the links 318A-C from the full view 324 are not shown. The missing links 318A-C can mean that a user has selected to exclude the links in order to focus on other elements in the limited view 326. However, alternatively, the missing links 318A-C can indicate a lack of connection between collector 320 and the devices or appliances associated with segments 316A-C.

Moreover, the limited view 326 can show link 322 between collector 320 and cloud 150. Link 322 can be displayed to show a current link and/or context between collector 320 and cloud 150.

Figure 3C:
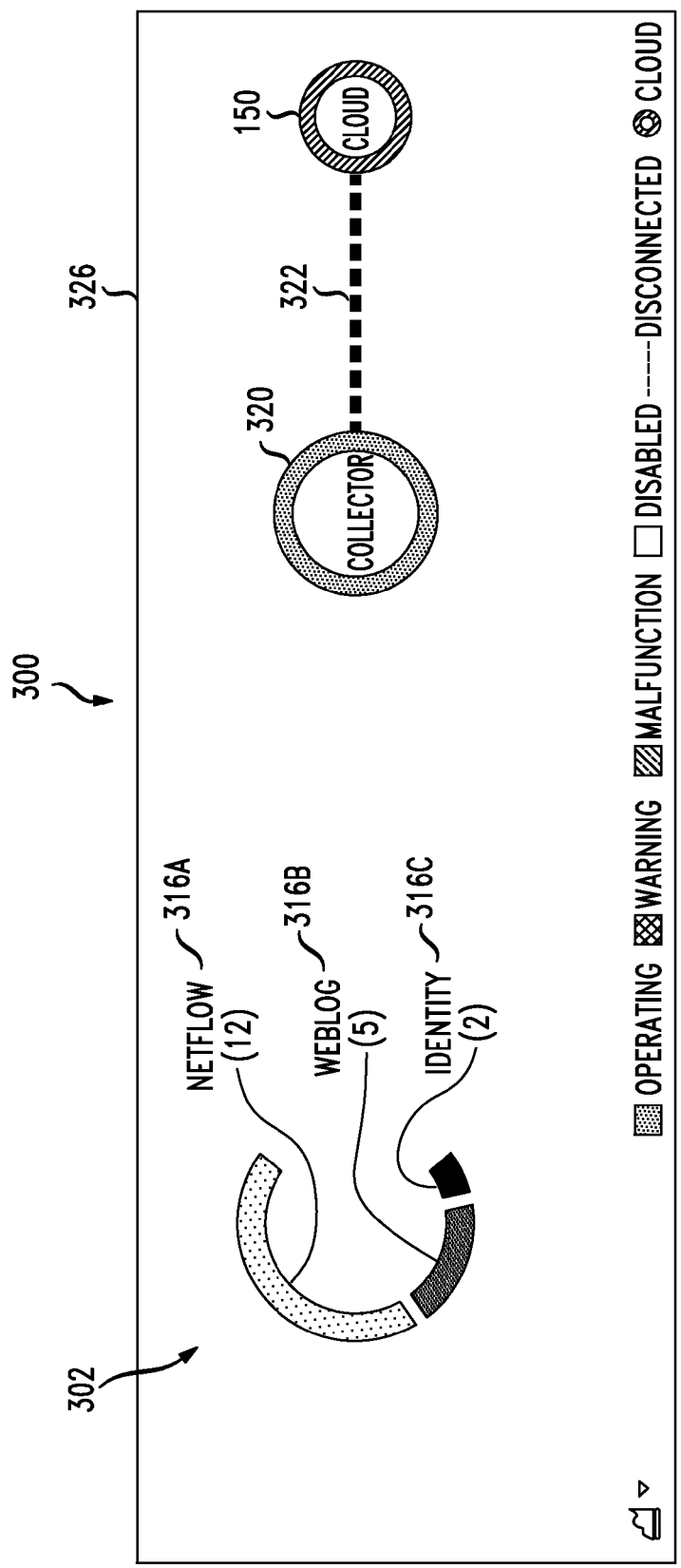

Referring to FIG. 3C, the limited view 326 can show a disconnected status of link 322 between collector 320 and the cloud 150. The disconnected status indicates that the connection between the collector 320 and cloud 150 has been disabled or has otherwise failed. Thus, the user can view the link 322 to quickly determine that collector 320 and cloud 150 are currently not connected. The disconnected status of link 322 can be depicted by a dashed or dotted line, for example. However, in other cases, the disconnected status can be depicted based on a missing link or other characteristics of the line representing the link 322. For example, the weight or type of line used to represent the link 322 can indicate the disconnected status.

Figure 3D:
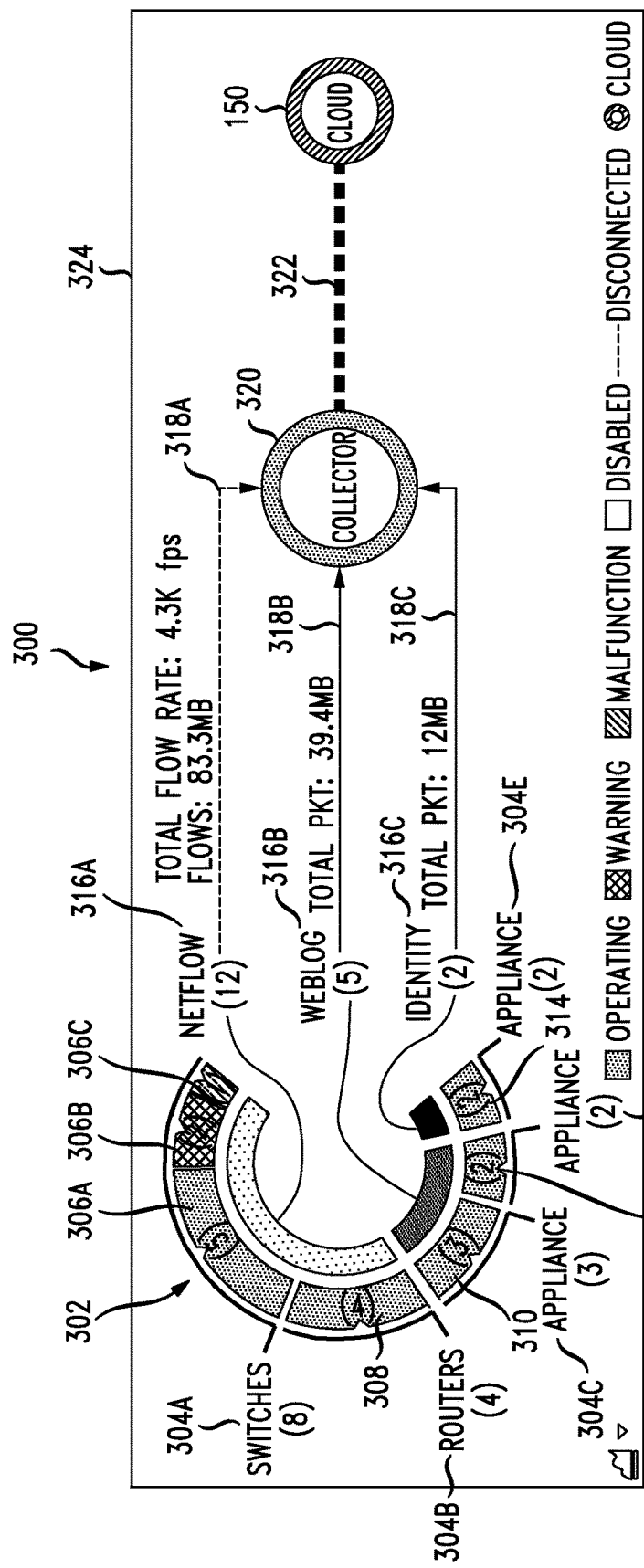

Referring to FIG. 3D, the full view 324 in graphical tool 300 can show a disconnected status of link 322, similar to the disconnected status of link 322 in FIG. 3C.

Figure 3E:
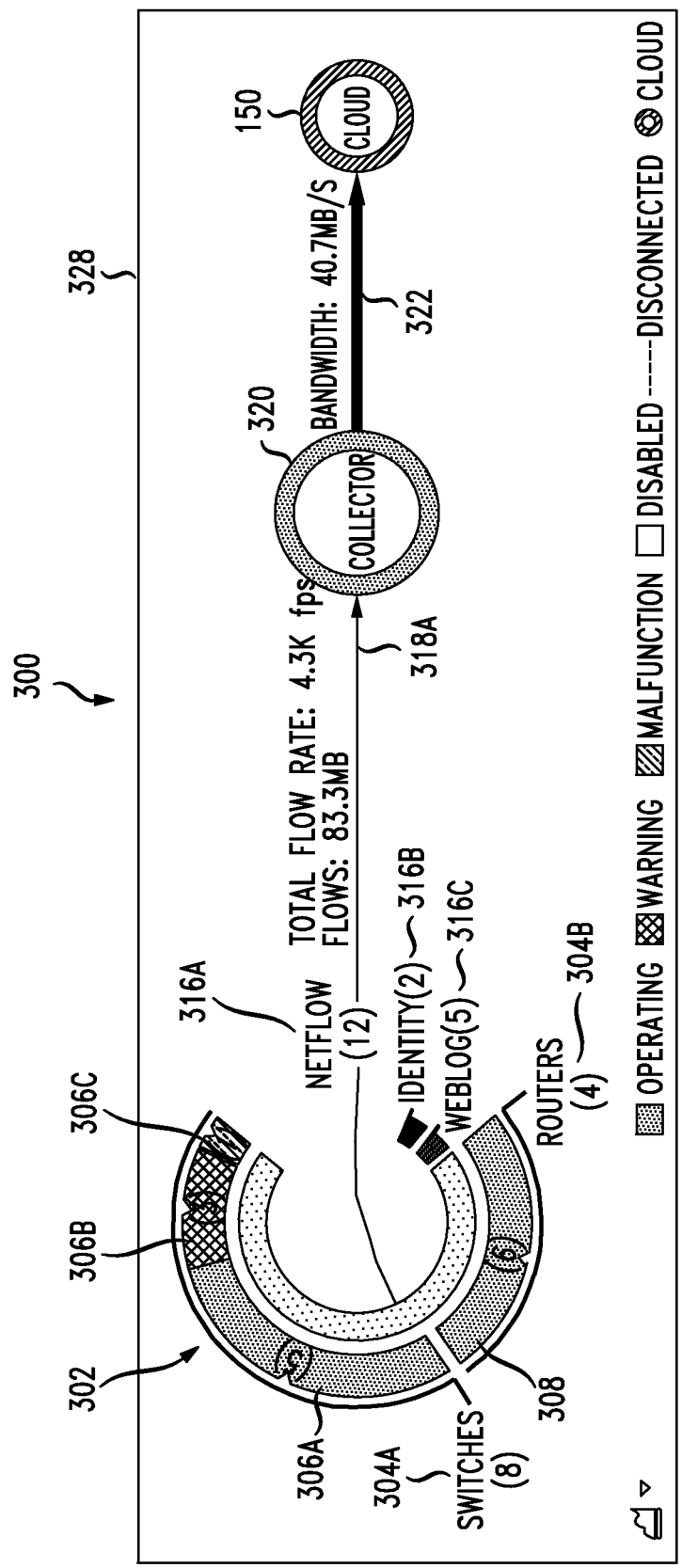

Referring to FIG. 3E, a view 328 of selected segments 304A-B can be provided in graphical tool 300 to focus on specific segments. Here, the graphical ring 302 can be modified to include segments 304A-B, as well as sub-segments 306A-C, to focus on the associated switches and devices. Thus, segments 304C-E can be excluded from the view 328. This can be useful if the user does not need to view the information about segments 304C-E, for example, and wants to limit the amount of elements depicted. As previously mentioned, the sizing of segments in the graphical tool 300 can be proportional to each other based on the number of items they represent. Thus, the sizing of the segments 304A-B and 306A-C can be adjusted within the graphical ring 302 when segments 304C-E are excluded from the view 328.

View 328 can also depict the concentric ring made up of segments 316A-C. However, the segments 316A-C can be sized according to the sizing of segments 304A-B. Thus, since segments 304A-B have increased in size and segments 304C-E have been excluded, segments 316A-C from the concentric ring can also be sized accordingly. Here, segment 316A, corresponding to segments 304A-B, are sized to cover the majority or all of the space within the concentric ring given that the focus of view 328 is on segments 304A-B, which correspond to segments 316A.

View 328 further includes link 318A to represent the NetFlow connection associated with segment 316A. Link 322 between collector 320 and cloud 150 is also included to depict the current connection between collector 320 and cloud 150.

Figure 3F:
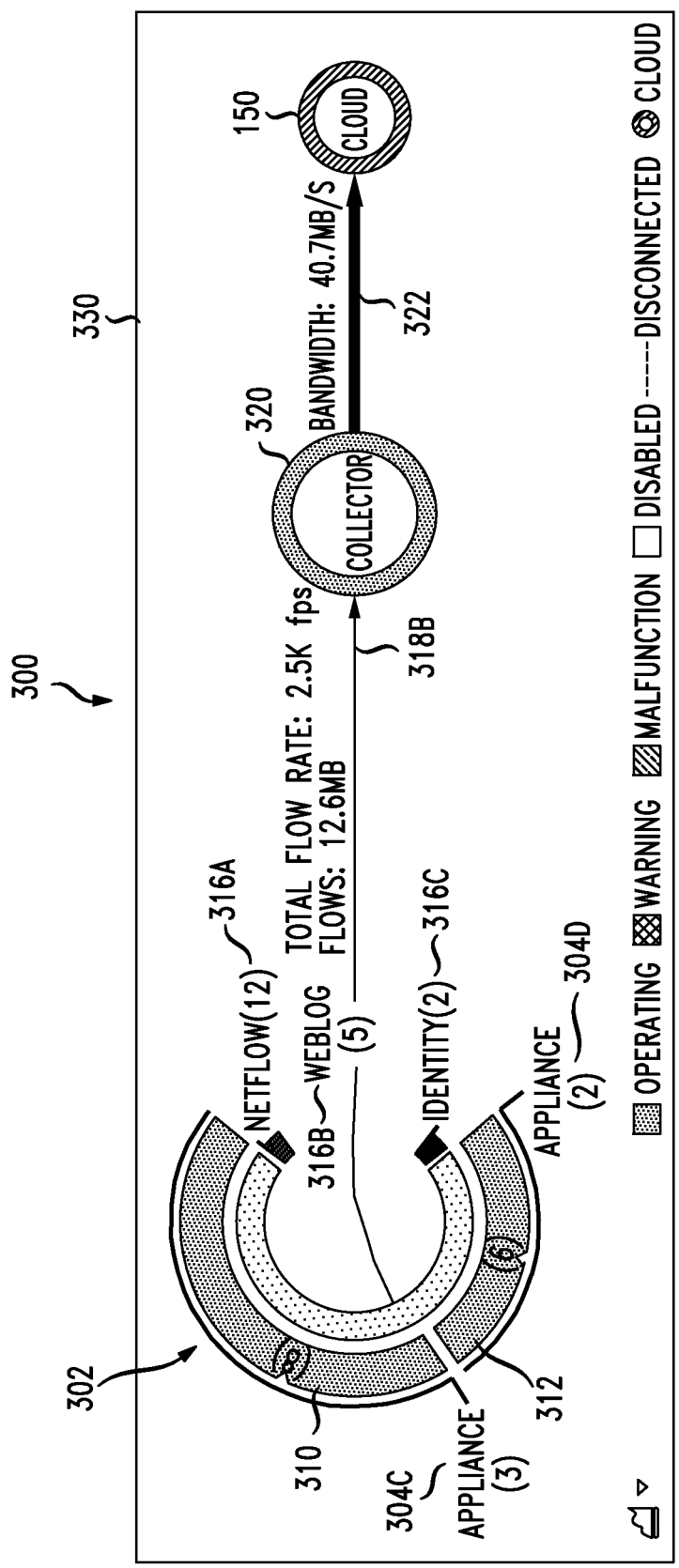

Referring to FIG. 3F, a view 330 of selected segments 304C-D can be provided in graphical tool 300 to focus on segments 304C-D. The view 330 can modify the graphical ring 302 to focus on selected segments 304C-D. Moreover, the view 330 can also focus the concentric ring of graphical ring 302 on sub-segment 316B, which corresponds to the selected segments 304C-D. Segment 316B can be depicted to show the status of the associated traffic and/or elements. For example, segment 316B can include a specific color-coding or pattern to show a normal or operating status, a warning status, a malfunction status, etc. Further, link 318B can be included to illustrate the connection to collector 320 relevant to segment 316B and the associated traffic (e.g., web traffic). Link 318B can depict the connection status, as well as the traffic statistics, such as rate, amount of flows, bandwidth, etc.

Figure 3G:
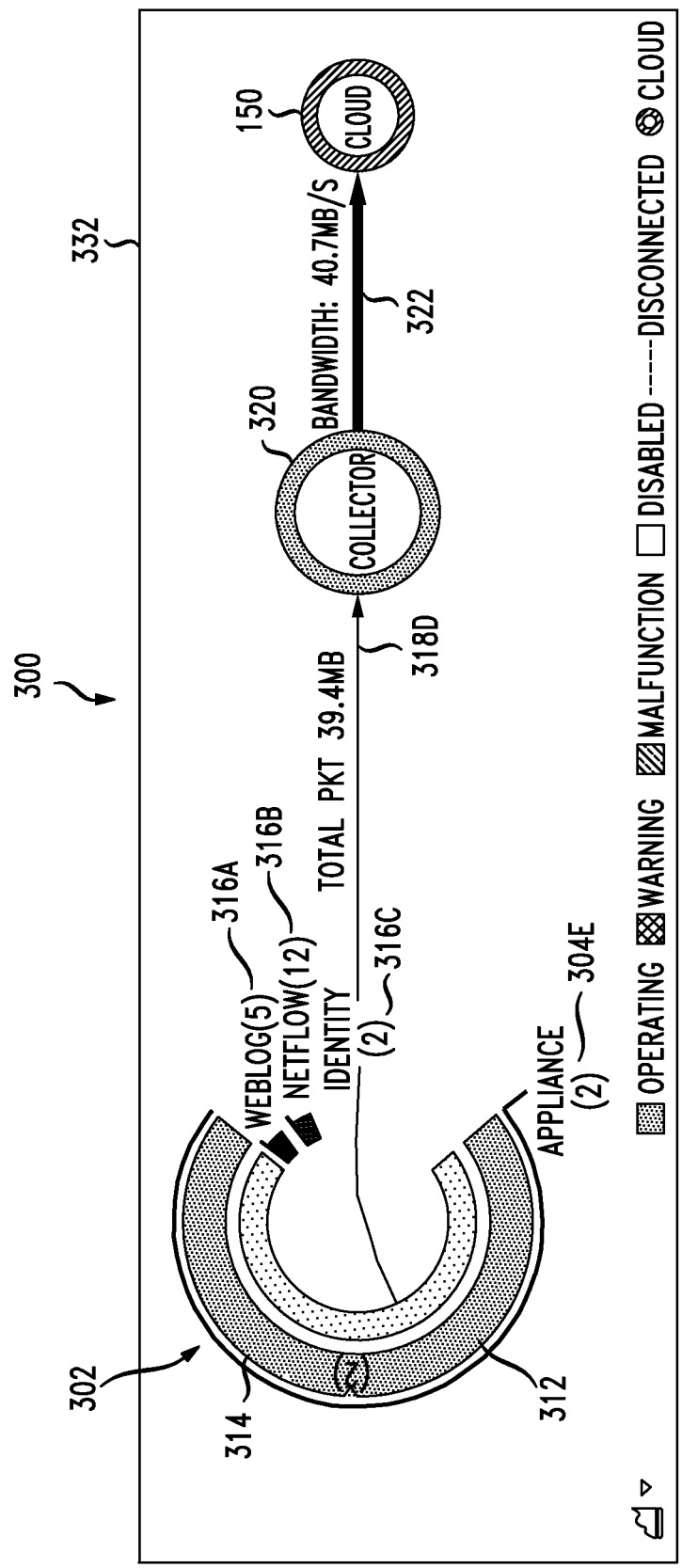

Referring to FIG. 3G, a view 332 of selected segment 304E can be provided in graphical tool 300 to focus on segment 304E. The view 330 can modify the graphical ring 302 to focus on selected segment 304E. Moreover, the view 330 can also focus the concentric ring of graphical ring 302 on sub-segment 316C, which corresponds to the selected segment 304E. Segment 316C can be depicted to show the status of the associated traffic and/or elements. For example, segment 316C can include a specific color-coding or pattern to show a normal or operating status, a warning status, a malfunction status, etc. Further, link 318C can be included to illustrate the connection to collector 320 relevant to segment 316C and the associated traffic (e.g., web traffic). Link 318C can depict the connection status, as well as the traffic statistics, such as rate, amount of flows, bandwidth, etc.

Figure 3H:
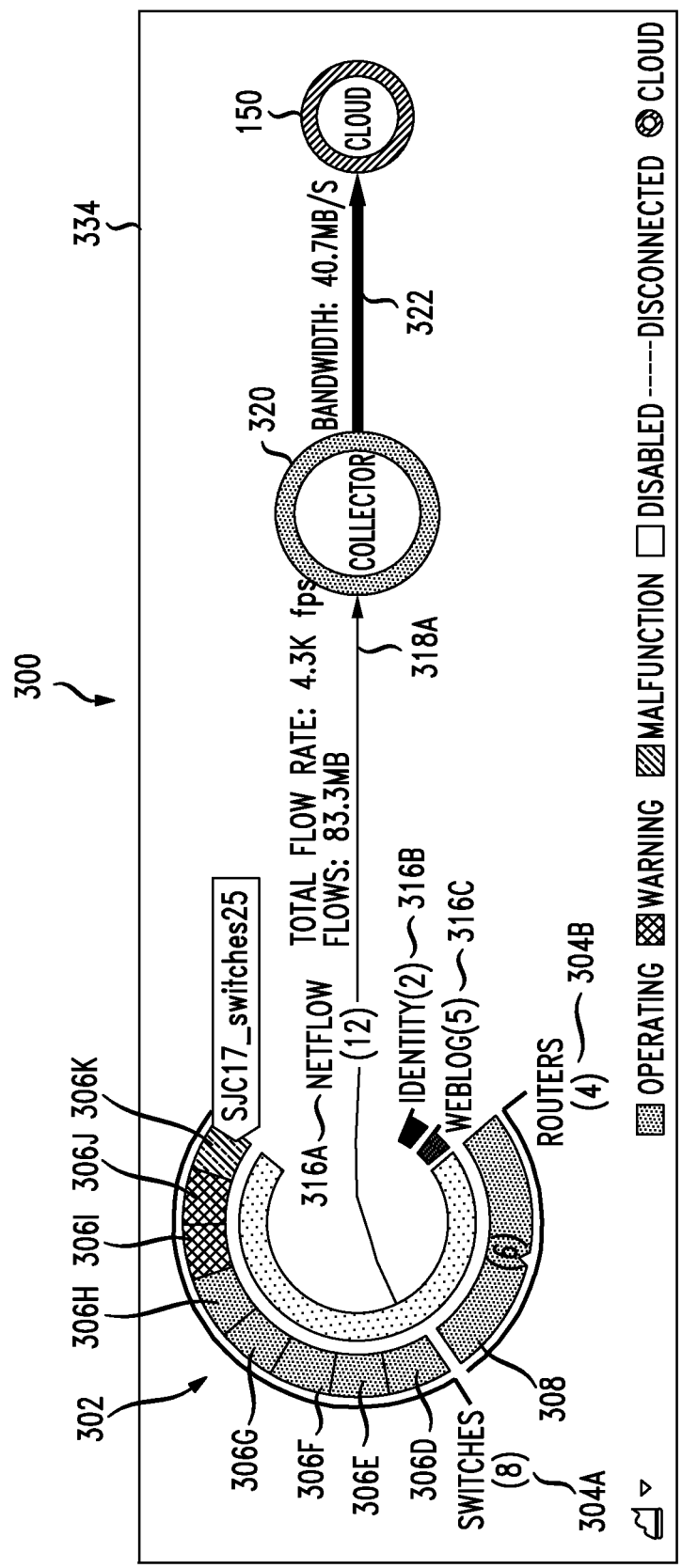

Referring to FIG. 3H, view 334 further focuses on segments 304A-B similar to view 328. In view 334, the graphical ring 302 is focused on segments 304A-B, and segment 304A is further segmented by individual device within segment 304A. For example, segment 304A indicates it represents 8 switches. Thus, segment 304A is further segmented into 8 segments, sub-segments 306D-K, to represent each switch in segment 304A. Each of the sub-segments 306D-K can indicate a current status of the associated switch. The current status can be indicated based on a pattern, a line, a color coding scheme, a symbol, a number, or any character. For example, sub-segments 306D-K are depicted with specific patterns to show the respective statuses of the associated switches. In particular, sub-segments 306D-H are shown with a particular pattern indicating a normal operating status. Thus, the switches represented by sub-segments 306D-H are identified as being in normal, operating mode. On the other hand, sub-segments 306I-J are shown with a different pattern indicating a warning status. Therefore, the switches represented by sub-segments 306I-J are identified as having a warning status. Finally, sub-segment 306K is shown with another pattern indicating a malfunction status. Accordingly, the switch represented by sub-segment 306K is identified as having a malfunction status. This way, through view 334, a user can easily determine the status of each device in segment 304A by looking at the graphical tool 300.

The switches represented by segment 304B, on the other hand, are all grouped by status. Thus, segment 304B is depicted with a status showing a normal, operating status for all switches. In some cases, segment 304B can otherwise be segmented by individual device as with segment 304A. Moreover, if one or more devices in segment 304B change to a different status, the segment 304B can be further segmented to depict the one or more devices in the different status.

In view 334, the graphical ring 302 can focus on sub-segment 316A corresponding to segments 304A-B, similar to the graphical ring 302 as shown in view 328. Moreover, view 334 can also show the link 318A to the collector 320, corresponding to sub-segment 316A.

Figure 3I:
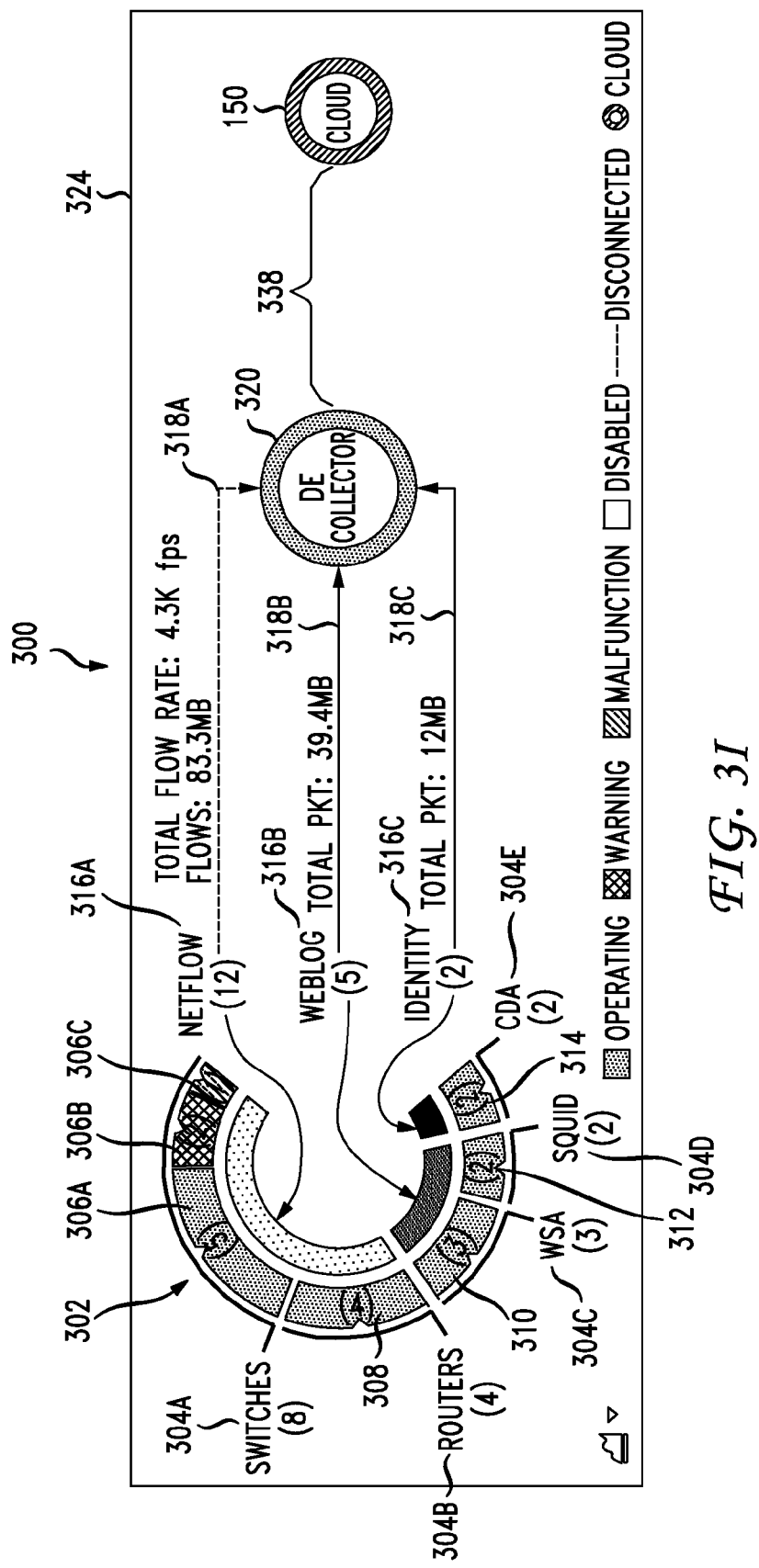

Referring to FIG. 3I, the view 324 can depict the graphical tool 300 with a missing link 338 between the collector 320 and cloud 150. The missing link 338 can indicate that the user has selected not to show a link between the collector 320 and cloud 150 or, alternatively, a link between the collector 320 and cloud 150 has failed or does not exist. This can provide the user useful information for troubleshooting. The missing link 338 can specifically identify the specific path or leg where the connection has malfunctioned or otherwise failed.

Figure 3J:
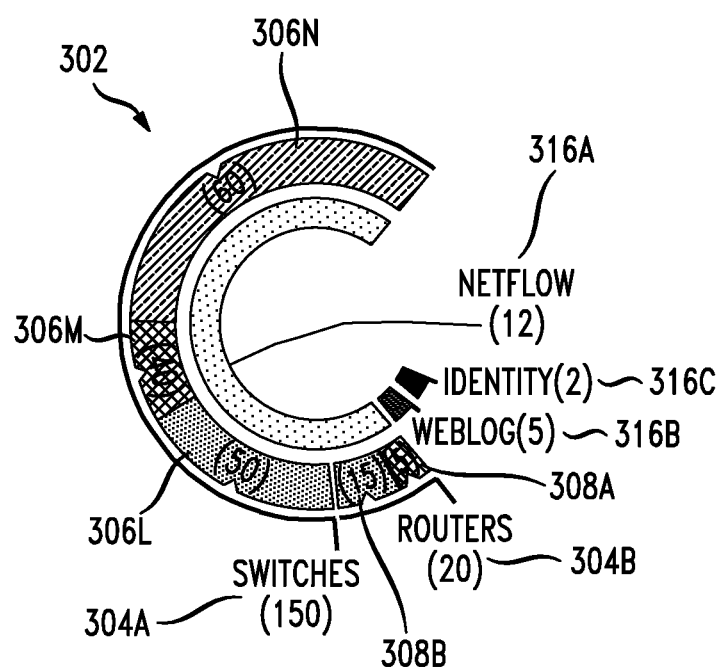

Referring to FIG. 3J, the graphical ring 302 can include modified segments grouping items by status. For example, graphical ring 302 in FIG. 3I can depict segments 304A-B segmented by status to create sub-segments 306L-N. Sub-segment 306L can indicate the number of items in that segment (i.e., 50), and can be illustrated according to the status of those segments. In particular, sub-segment 306L can indicate a normal, operating status of the items in sub-segment 306L.

Sub-segment 306M can indicate a number of items in sub-segment 306M (i.e., 40), and can be illustrated to depict a warning status. Sub-segment 306N can indicate a number of items in sub-segment 306N (i.e., 60), and can be illustrated to depict a malfunction status. Thus, a user can view graphical ring 302 and ascertain from looking at sub-segments 306L-N that 50 of the switches have a normal, operating status, 40 have a warning, and 60 have a malfunction status.

Further, graphical ring 302 can also partition segment 304B by groups of items having a respective status. For example, segment 304B can be partitioned to create sub-segments 308A-B. Sub-segments 308A-B can indicate the number of respective items in each sub-segment, and can be graphically illustrated to depict a respective status of the items represented by each sub-segment. For example, sub-segment 308A can indicate it represents 5 routers, and can be depicted to illustrate a warning status for the 5 routers. Sub-segment 308B can indicate it represents 15 routers, and can be depicted to illustrate a normal, operating status for the 15 routers. Thus, a user can view the graphical ring 302 and ascertain from looking at sub-segments 308A-B that 5 routers have a warning and 15 are in normal, operating mode.

Figure 4A:
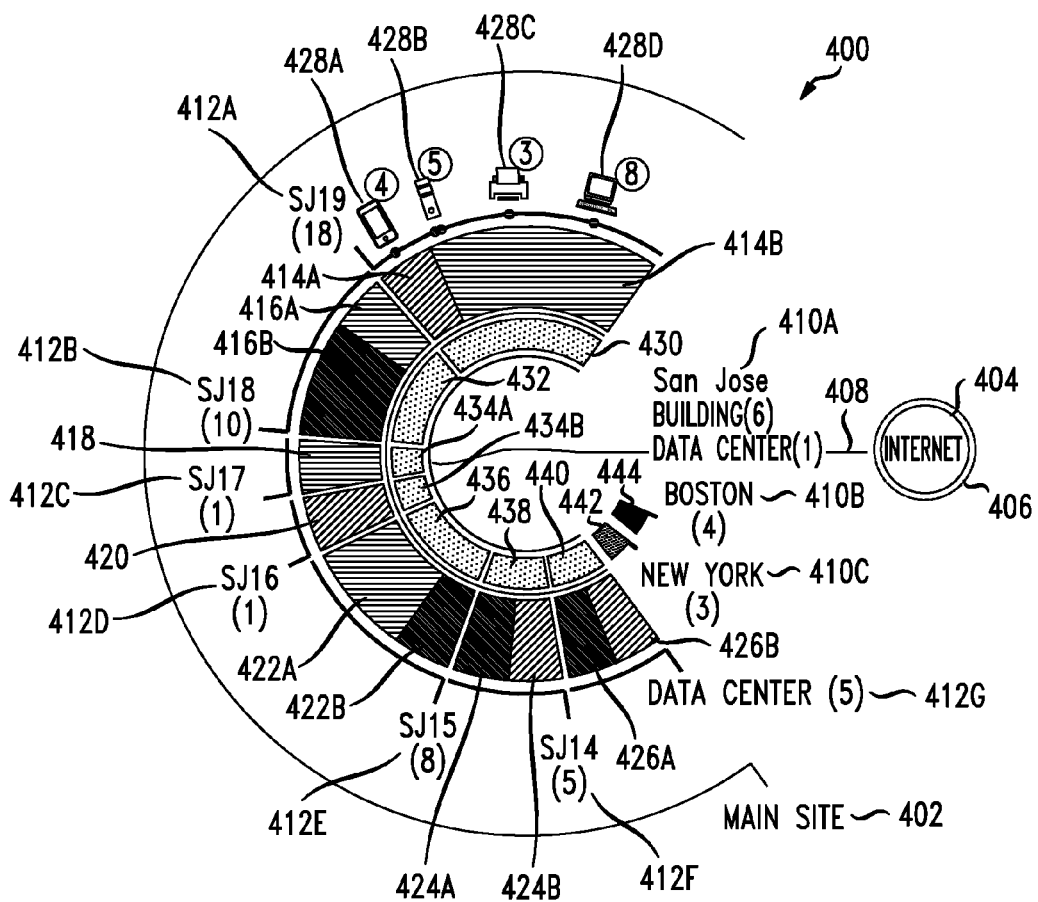
FIGS. 4A-B illustrate example graphical rings for a network visualization tool.
Figure 4B:
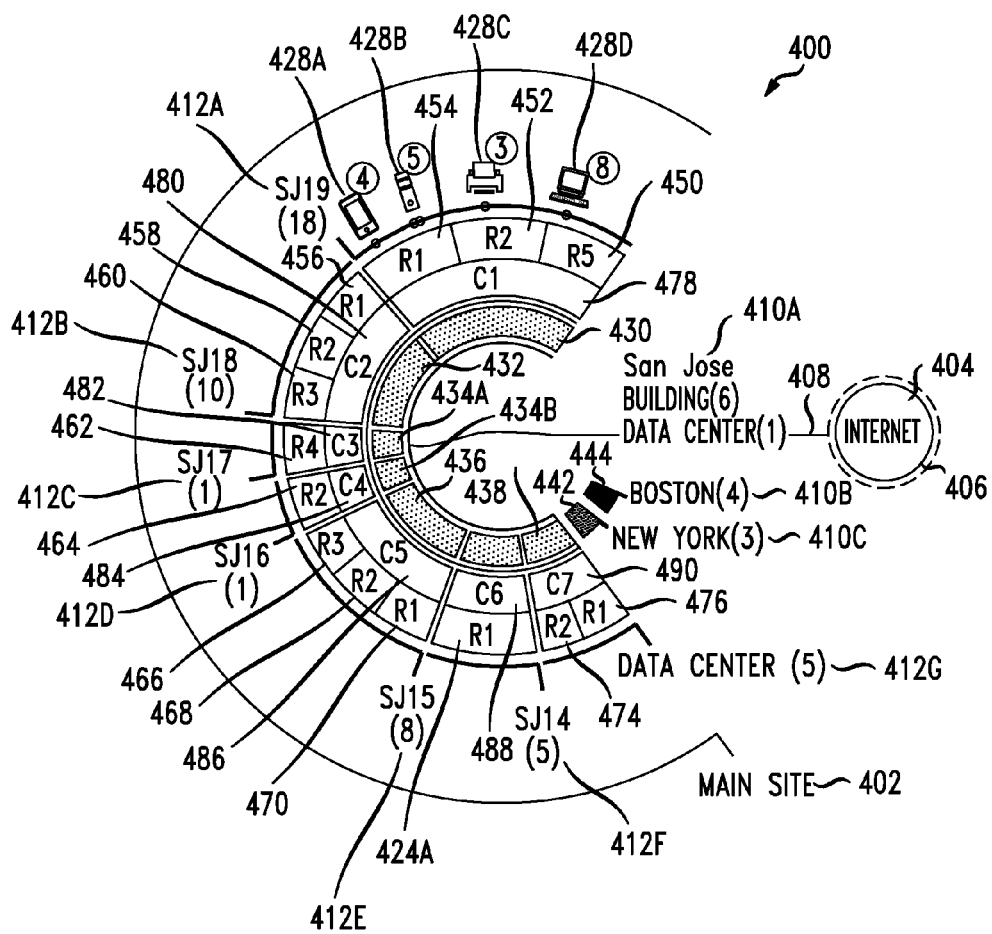

FIGS. 4A-B illustrate a graphical ring 400 representing one or more networks and/or devices. Referring to FIG. 4A, the graphical ring 400 includes a main ring 402 representing a main site. The main site can refer to one or more physical and/or logical sites. The graphical ring 400 can also include segments 412A-G. Segments 412A-G can represent specific buildings. For example, segments 412 A-F can represent different buildings or branches in San Jose, and segment 412G can represent a data center. Each of the segments 412A-G can include an indication of the number of elements (e.g., devices, appliances, services) within each respective segment. For example, segment 412A indicates 18 elements reside in the particular San Jose building or branch associated with segment 412A.

Branch 412A can also include elements 428A-D. Elements 428A-D can indicate the type and/or number of devices in branch 412A. Elements 428A-D can also be aligned with sub-segments 414A-B to indicate a corresponding status of the respective elements 428A-D, as further describe below with respect to sub-segments 414A-B. Other branches can also similarly include elements such as elements 428A-D. However, for clarity purposes and for the sake of explanation, only branch 412A is shown herein with elements 428A-D.

Further, each of the segments 412A-G can also indicate a status of specific groups of elements within the segments 412A-G. Specifically, segments 412A-G can be partitioned into sub-segments 414A-B, 416A-B, 418, 420, 422A-B, 424A-B, and 426A-B, which correspond to elements grouped by status. For example, sub-segment 414A can represent elements having a mild security status, where mild can be determined based on a threshold score or a specific condition or circumstance, and sub-segment 414B can represent elements having a severe security status. The status of each of the sub-segments 414A-B, 416A-B, 418, 420, 422A-B, 424A-B, and 426A-B can be depicted based on a color-coding, a pattern, a symbol, a number, a character, a shape, or any other graphical representation. Moreover, the status represented by sub-segments 414A-B, 416A-B, 418, 420, 422A-B, 424A-B, and 426A-B can refer to specific types of security status, performance conditions, settings, operating conditions, hardware characteristics, network connectivity, software or service status, or any other characteristic, circumstance or condition. Further, the sub-segments 414A-B, 416A-B, 418, 420, 422A-B, 424A-B, and 426A-B can be arranged as a ring concentric to segments 412A-G, and can be proportionally sized based on the number of elements in each sub-segment relative to a total number of elements.

Segments 430-444 can be included as another layer or ring concentric to sub-segments 414A-B, 416A-B, 418, 420, 422A-B, 424A-B, and 426A-B. Segments 430-444 can represent groups of elements having a particular status. For example, segments 430-440 can be depicted to indicate a normal operating status for the associated elements, segment 442 can be depicted to show a warning status for the associated elements, and segment 44 can be depicted to show a malfunction status for the associated elements.

Furthermore, segments 430-444 can be sized and/or aligned according to one or more of the sub-segments 414A-B, 416A-B, 418, 420, 422A-B, 424A-B, and 426A-B. This can indicate a relationship between the aligned segments from 414A-B, 416A-B, 418, 420, 422A-B, 424A-B, and 426A-B and those from 430-444 and/or the similarly sized segments or groups of segments. Such relationship can mean that the aligned segments or the similarly-sized segments represent the same elements. Thus, if sub-segments 414A-B, 416A-B, 418, 420, 422A-B, 424A-B, and 426A-B indicate a specific type of status, such as a security status, and the segments 430-444 represent a different type of status, such as an operating status, then the combination of segments from 414A-B, 416A-B, 418, 420, 422A-B, 424A-B, and 426A-B and 430-444 can together indicate multiple statuses for particular groups of devices, such as both a security status and an operating status.

For example, segment 430 is sized and aligned according to sub-segments 414A-B. This can indicate that segment 430 represents the same elements as sub-segments 414A-B, from building or branch 412A. Thus, since branch 412A represents 18 elements, sub-segment 414A represents 4 elements having a mild security condition, sub-segment 414B represents 14 elements with a severe security condition, and segment 430 represents a normal operating status, then the combined relationship of branch 412A, sub-segments 414A-B and segment 430 can indicate that branch 412 has 18 elements of which 4 have a mild security condition, 14 have a severe security condition, and all 18 have a normal operating status. This taxonomy can visually depict multiple layers of attributes, conditions, events, characteristics, and relationships between networks and elements.

Labels 410A-C can indicate the number of branches represented by the graphical ring 400. For example, label 410A can represent San Jose, and can indicate that San Jose has 6 buildings and 1 data center. Label 410B can indicate that Boston has 4 buildings, and label 410C can indicate that New York has 3 buildings.

In addition, the graphical ring 400 can include a link 408 to the Internet 404. In other embodiments, the link 408 can be to a different network or device, such as a cloud 150 or a centralized server. Moreover, link 408 can be specific to a particular building or branch. For example, in FIG. 4A, link 408 represents a link between the data center 412G and the Internet 404. The Internet 404 representation can also include specific indications or conditions. For example, the Internet 404 can include a firewall element 406 indicating an active firewall handling traffic to and from the Internet 404. In some embodiments, the element 406 can show different firewall or security conditions.

Referring to FIG. 4B, the graphical ring 400 can include further layers defining other elements or details about each branch or building. For example, segments 478-490 can represent core switches or routers. This can indicate what core device is located where, and/or which devices are served by that specific core device. For example, segment 478 indicates that core device C1 is located in branch 412A, and serves elements 428A-D and switches R1-3, represented by segments 450-454.

Segments 450-476 represent switches at specific branches. For example, segments 450-454 represent switches R1-R3 on branch 412A, which are served by core device C1 represented by segment 478. As another example, segments 456-460 represents switches R1-R3 in branch 412B, which are served by core device C2 represented by segment 480.

The further layering by devices, switches and core devices can show which specific devices reside in a branch, which switches serve the branch and specific devices, and which core device(s) serve the branch. This can provide a graphical view of the layout of a network and branch, including the devices, switches, and routers as well as the inter-relationships.

Figure 5:
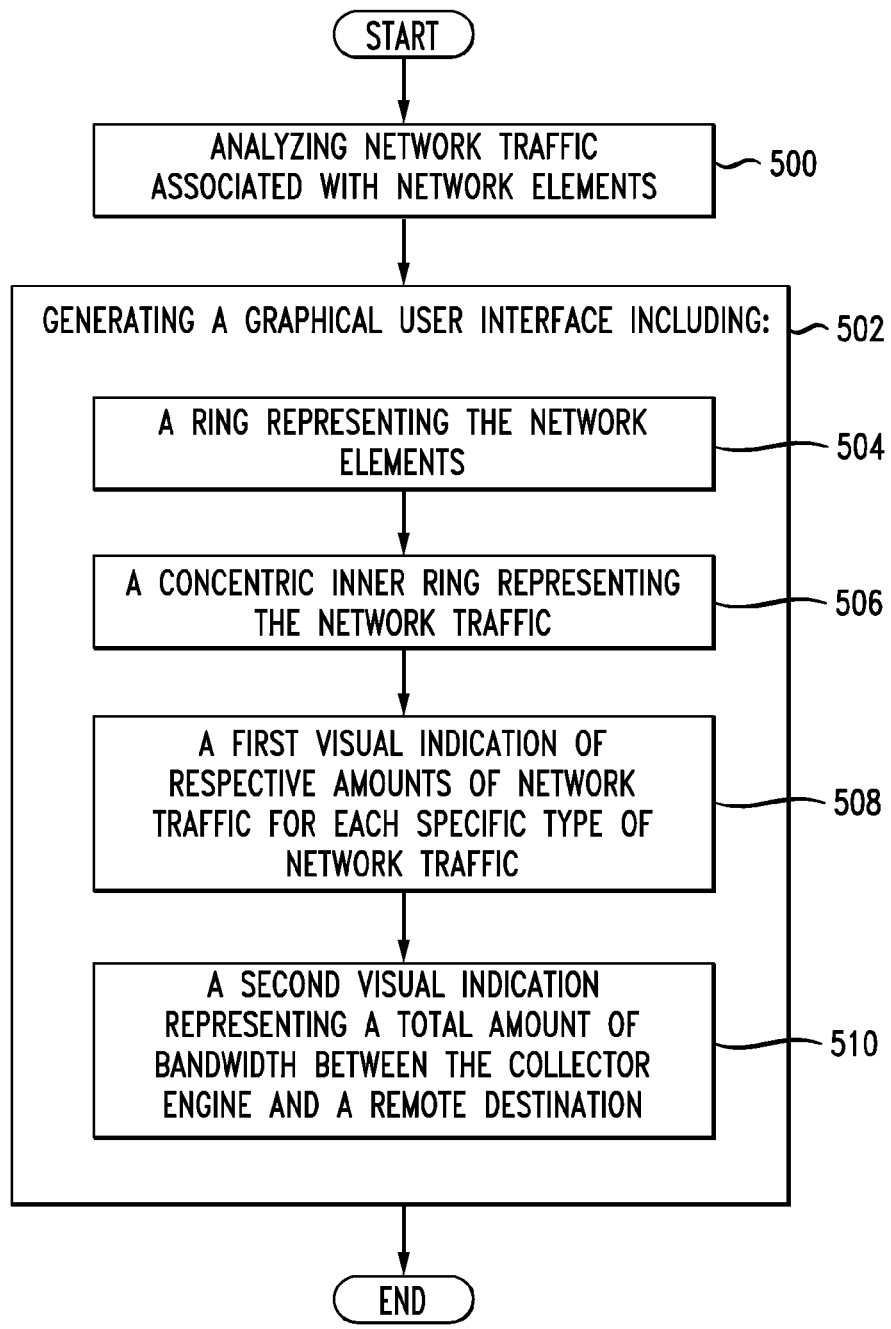
FIGS. 5 and 6 illustrate example method embodiments.
Figure 6:
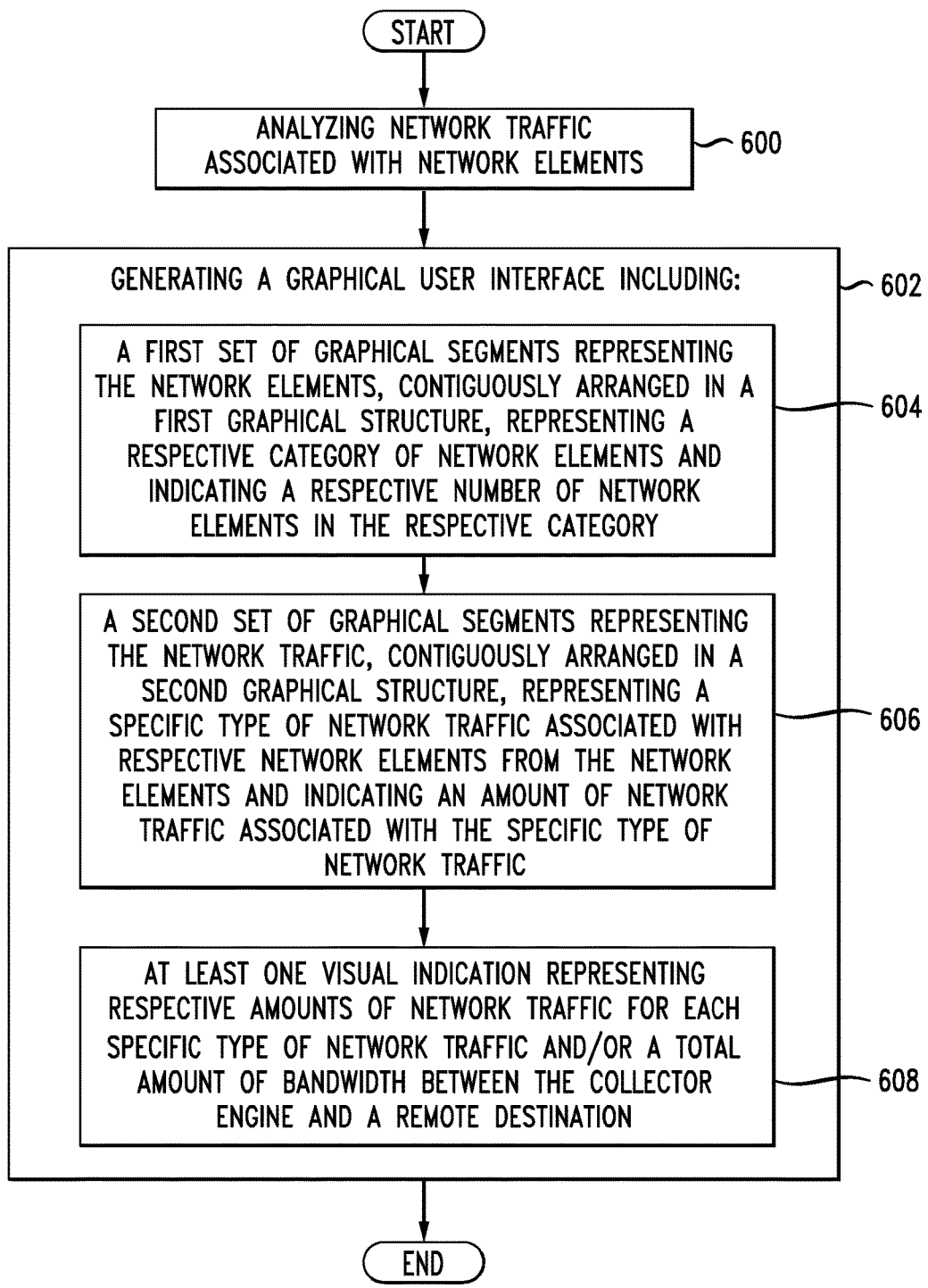

The disclosure now turns to the example method embodiments shown in FIGS. 5 and 6. For the sake of clarity, the methods are described in terms of a collector 212, as shown in FIG. 2, configured to practice the methods. The steps outlined herein are exemplary and can be implemented in any combination thereof, including combinations that exclude, add, or modify certain steps.

Referring to FIG. 5, collector 212 can analyze network traffic associated with network elements (500) and generate a graphical user interface (GUI) (502). The GUI can include a ring representing the network elements (504). The ring can include segments around a perimeter of the ring, and each of the segments can represent a respective category of network elements and indicate a number of network elements in the respective category. A category can include, for example, switches, routers, appliances, services, locations, roles, branches, networks, proxies, content filtering systems, firewalls, directory agents, and so forth. The GUI can also include a concentric inner ring representing the network traffic (506). The concentric inner ring can include inner segments around a perimeter of the concentric inner ring, and each of the inner segments can represent a specific type of network traffic and indicate an amount of network traffic associated with the specific type. Specific types of network traffic can include, for example, netflow traffic, web traffic, security traffic, data traffic, protocol traffic, identity traffic, login traffic, profile traffic, encrypted traffic, IP traffic, user traffic, device traffic, user identify data, unencrypted traffic, roaming traffic, remote traffic, or any other specific type of traffic.

In other embodiments, the segments can represent other categories or elements, such as geo-locations, device roles, hierarchies, protocols, status categories, security categories, service categories, traffic categories, etc. Moreover, the GUI can include additional layers of details by way of additional rings or sub-rings. For example, the GUI can include multiple concentric rings depending on the amount of detail desired by the user and/or the complexity of the view of the GUI or the network or context depicted. In addition, the segments can include additional details and depict additional information, such as traffic amounts or flows, rates, device or appliance numbers, errors, status indications, conditions, flags, attributes, etc. Also, the rings and/or segments can be sized proportionally or relative to the number of elements they represent with respect to the total number of elements and/or with respect to each other.

The GUI can also include a first visual indication of respective amounts of network traffic for each specific type (508) and a second visual indication representing a total amount of bandwidth to a remote destination (510). The destination can be, for example, a cloud, a server, a network, a monitoring device, a database, and so forth. For example, in some cases, the second visual indication can represent a total bandwidth to a cloud controller in a cloud environment.

In some cases, the GUI can include a second concentric inner ring representing respective geographic locations associated with the network elements. The second concentric inner ring can also include inner concentric segments arranged around a perimeter of the second concentric inner ring. Each of the inner concentric segments can represent a branch office, a geographic area, a network segment, or a logical division.

The collector engine 212 can be graphically depicted to indicate a current status or condition. The current status can include a disabled status, a disconnected status, an operating status, a warning status, a malfunction status, etc. Moreover, the GUI can include an indication of the links between the collector engine 212 and specific elements or branches, as well as a link between the collector engine 212 and a cloud environment, such as cloud 150. Each link can also include specific attributes or characteristics to depict a status or condition of the link, the type of link, the amount of bandwidth, the amount of data transferred, etc.

The GUI and/or each of the rings can be dynamically updated based on user input and/or a change of conditions. For example, if a link or device goes down, the GUI can be updated dynamically to depict the new status of the link or device. Moreover, the GUI can include indications of how traffic is processed between devices depicted by the GUI. For example, the GUI can include an indication that an active firewall is or is not handling traffic to and from a point of origin or destination, such as the Internet.

While the various examples above are described in terms of specific devices, such as appliances or branches, one of ordinary skill in the art will readily recognize that the concepts described herein can apply to other devices, networks, or environments. For example, the GUI concepts can apply to different networks and topologies, different types of devices, different protocols, different types of conditions, different number of steps or items, etc. Moreover, the graphical indications or attributes provided in the GUI to depict specific information can vary in different implementations. For example, in some implementations, the GUI can be color-coded to illustrate various conditions.

Referring to FIG. 6, collector 212 can analyze network traffic associated with network elements (600) and generate a graphical user interface (GUI) (602). The GUI can include a first set of graphical segments representing the network elements and contiguously arranged in a first graphical structure, each of the first set of graphical segments representing a respective category of network elements and indicating a respective number of network elements in the respective category (604).

The respective category of network elements represented by each of the first set of graphical segments can include, for example, a geolocation; a data flow; an amount of traffic, such as bytes transferred; device status, such as active, inactive, warning, or disconnected; a device type, such as switches, routers, security appliances, proxies, content directories, or content filtering systems; a type of traffic, such as netflow traffic, web traffic, file server traffic, media traffic; etc.

In some cases, the first set of graphical segments can represent respective network elements having different statuses, such as operating, warning, malfunction, disabled, or disconnected, for example.

Each of the first set of graphical segments can include one or more sub-segments. The sub-segments can represent a respective sub-category of network elements. Moreover, the respective sub-category of network elements can include a respective number of network elements having a specific current condition ascertained from the network traffic, or a group of network elements having a specific status or context, for example.

Further, each of the first set of graphical segments can be scaled according to a respective number of network elements in the respected category represented by each segment relative to a total number of network elements. Thus, the size of each graphical segment can provide a visual indication of the number of network elements in the respective category of network elements represented by that specific graphical segment relative to the total number of network elements. Moreover, the size of each of the first set of graphical segments can be based on the respective number of network elements in the respective category represented by each graphical segment.

The GUI can also include a second set of graphical segments representing the network traffic and contiguously arranged in a second graphical structure, each of the second set of graphical segments representing a specific type of network traffic associated with respective network elements from the network elements and indicating an amount of network traffic associated with the specific type of network traffic (606).

The specific type of network traffic represented by each of the second set of graphical segments can be, for example, Internet Protocol (IP) network traffic, web traffic, identity traffic (e.g., traffic associated with a user identity), etc.

In addition, the GUI can include one or more visual indications representing respective amounts of network traffic for each specific type of network traffic and/or a total amount of bandwidth between the collector engine and a remote destination (608). For example, in some embodiments, the GUI can include a first visual indication representing respective amounts of network traffic for each specific type of network traffic represented by the second set of graphical segments, and a second visual indication representing a total amount of bandwidth between the collector engine and the remote destination. Moreover, the one or more visual indications can include a visual link from a respective representation of each specific type of network traffic to the collector engine 212. Here, the visual link can indicate a status associated with each specific type of network traffic, such as a disabled status, a disconnected status, an operating status, a warning status, or a malfunction status, for example.

The remote destination can be, for example, a server, a network, a device, an office or branch, a cloud, such as cloud 150, or a cloud controller, such as controller 185. Moreover, the collector engine 212 can be graphically depicted to indicate a current status, such as a disabled status, a disconnected status, an operating status, a warning status, or a malfunction status.

Moreover, the graphical segments from the first and/or second sets of graphical segments can be user-selectable. A selection of a graphical segment can result in, or trigger, an updated version of the graphical user interface. The updated version of the graphical user interface can include additional segments and information relevant to the selected graphical segment. For example, the selection of the graphical segment can trigger an updated graphical structure representing network elements associated with the selected graphical segment. More specifically, the updated graphical structure can include a set of segments arranged contiguously in the updated graphical structure, and each of the set of segments can represent or indicate a respective attribute associated with associated network elements.

Also, the first and second graphical structures can be one or more specific geometric shapes, and can be depicted according to a specific relationship, arrangement, alignment, order, or placement. For example, the first and second graphical structures can be rings, which can be open or closed circles. In some embodiments, the first graphical structure can be a ring, such as an outer ring, and the second graphical structure can be an inner or concentric ring. Thus, the second graphical structure can be a ring within a second ring represented by the first graphical structure. In other embodiments, the first and/or second graphical structures can represent other shapes and relationships. For example, the first and second graphical structures can represent layers in a larger pyramid or triangle structure, contiguous layers or squares in a container, boxes, overlapping shapes, etc.

In some embodiments, the GUI can also include a third set of graphical elements representing respective geographic locations associated with the network elements. Each of the third set of graphical elements can be contiguously arranged in a third graphical structure and represent a branch office, a geographic area, a network segment, or a logical division.

EXAMPLE DEVICES

FIG. 7 illustrates an example network device 710 suitable for high availability and failover. Network device 710 includes a master central processing unit (CPU) 762, interfaces 768, and a bus 715 (e.g., a PCI bus). When acting under the control of appropriate software or firmware, the CPU 762 is responsible for executing packet management, error detection, and/or routing functions. The CPU 762 preferably accomplishes all these functions under the control of software including an operating system and any appropriate applications software. CPU 762 may include one or more processors 763 such as a processor from the Motorola family of microprocessors or the MIPS family of microprocessors. In an alternative embodiment, processor 763 is specially designed hardware for controlling the operations of router 710. In a specific embodiment, a memory 761 (such as non-volatile RAM and/or ROM) also forms part of CPU 762. However, there are many different ways in which memory could be coupled to the system.

The interfaces 768 are typically provided as interface cards (sometimes referred to as "line cards"). Generally, they control the sending and receiving of data packets over the network and sometimes support other peripherals used with the router 710. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 762 to efficiently perform routing computations, network diagnostics, security functions, etc.

Although the system shown in FIG. 7 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 761) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

FIG. 8A and FIG. 8B illustrate example system embodiments. The more appropriate embodiment will be apparent to those of ordinary skill in the art when practicing the present technology. Persons of ordinary skill in the art will also readily appreciate that other system embodiments are possible.

FIG. 8A illustrates a conventional system bus computing system architecture 800 wherein the components of the system are in electrical communication with each other using a bus 805. Exemplary system 800 includes a processing unit (CPU or processor) 810 and a system bus 805 that couples various system components including the system memory 815, such as read only memory (ROM) 870 and random access memory (RAM) 875, to the processor 810. The system 800 can include a cache of high-speed memory connected directly with, in close proximity to, or integrated as part of the processor 810. The system 800 can copy data from the memory 815 and/or the storage device 830 to the cache 817 for quick access by the processor 810. In this way, the cache can provide a performance boost that avoids processor 810 delays while waiting for data. These and other modules can control or be configured to control the processor 810 to perform various actions. Other system memory 815 may be available for use as well. The memory 815 can include multiple different types of memory with different performance characteristics. The processor 810 can include any general purpose processor and a hardware module or software module, such as module 1 837, module 2 834, and module 3 836 stored in storage device 830, configured to control the processor 810 as well as a special-purpose processor where software instructions are incorporated into the actual processor design. The processor 810 may essentially be a completely self-contained computing system, containing multiple cores or processors, a bus, memory controller, cache, etc. A multi-core processor may be symmetric or asymmetric.

To enable user interaction with the computing device 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art. In some instances, multimodal systems can enable a user to provide multiple types of input to communicate with the computing device 800. The communications interface 840 can generally govern and manage the user input and system output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 875, read only memory (ROM) 870, and hybrids thereof.

The storage device 830 can include software modules 837, 834, 836 for controlling the processor 810. Other hardware or software modules are contemplated. The storage device 830 can be connected to the system bus 805. In one aspect, a hardware module that performs a particular function can include the software component stored in a computer-readable medium in connection with the necessary hardware components, such as the processor 810, bus 805, display 835, and so forth, to carry out the function.

FIG. 8B illustrates an example computer system 850 having a chipset architecture that can be used in executing the described method and generating and displaying a graphical user interface (GUI). Computer system 850 is an example of computer hardware, software, and firmware that can be used to implement the disclosed technology. System 850 can include a processor 855, representative of any number of physically and/or logically distinct resources capable of executing software, firmware, and hardware configured to perform identified computations. Processor 855 can communicate with a chipset 860 that can control input to and output from processor 855. In this example, chipset 860 outputs information to output 865, such as a display, and can read and write information to storage device 870, which can include magnetic media, and solid state media, for example. Chipset 860 can also read data from and write data to RAM 875. A bridge 880 for interfacing with a variety of user interface components 885 can be provided for interfacing with chipset 860. Such user interface components 885 can include a keyboard, a microphone, touch detection and processing circuitry, a pointing device, such as a mouse, and so on. In general, inputs to system 850 can come from any of a variety of sources, machine generated and/or human generated.

Chipset 860 can also interface with one or more communication interfaces 890 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 855 analyzing data stored in storage 870 or 875. Further, the machine can receive inputs from a user via user interface components 885 and execute appropriate functions, such as browsing functions by interpreting these inputs using processor 855.

It can be appreciated that example systems 800 and 850 can have more than one processor 810 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

We claim:

1. A method comprising:
analyzing, via a collector engine, network traffic associated with a plurality of network elements; and
generating a graphical user interface comprising:
a first plurality of graphical segments representing the plurality of network elements in different categories with different statuses, each of the first plurality of graphical segments (i) being contiguously arranged relative to another of the first plurality of graphical segments in a first graphical structure, (ii) indicating at least one of the categories of the plurality of network elements, (iii) indicating a number of network elements in the at least one of the categories, and (iv) having at least one sub-segment of a plurality of sub-segments, each of the plurality of sub-segments indicating a first grouping of one or more network elements in a same category and having a same status, the plurality of sub-segments representing the different statuses of the plurality of network elements; and
a second plurality of graphical segments representing the plurality of network elements, each of the second plurality of graphical segments (i) being contiguously arranged relative to another of the second plurality of graphical segments in a second graphical structure, and (ii) indicating a second grouping of the one or more network elements in a same geographic location, branch office, network segment, or logical division.

2. The method of claim 1, wherein each of the plurality of sub-segments is scaled according to a respective number of categories represented such that a first sub-segment representing more categories is larger than a second sub-segment representing fewer categories.

3. The method of claim 1, wherein each of the second plurality of graphical segments is scaled according to a respective number of all categories represented such that a one of the second plurality of graphical segments representing more categories is larger than another of the second plurality of graphical segments representing fewer categories.

4. The method of claim 1, wherein respective ones of each of the first plurality of graphical segments and the second plurality of graphical segments are concentrically arranged relative to each other about an axis.

5. The method of claim 4, wherein each of the plurality of sub-segments are concentrically arranged relative to each other about the axis.

6. The method of claim 1, wherein each of the different categories is a device type.

7. The method of claim 1, wherein the second plurality of graphical segments represents a security status of respective network elements.

8. The method of claim 1, wherein the different categories include at least two of switches, routers, security appliances, proxies, content directories, or content filtering systems.

9. The method of claim 1, wherein the collector engine is graphically depicted to indicate a current status, the current status comprising a disabled status, a disconnected status, an operating status, a warning status, or a malfunction status, and wherein the first graphical structure and the second graphical structure comprise geometric shapes arranged in one of parallel, in layers, or a concentric fashion.

10. The method of claim 1, wherein the second plurality of graphical segments indicates a security status.

11. A system comprising:
a processor; and
a computer-readable storage medium having stored therein instructions which, when executed by the processor, cause the processor to perform operations comprising:
analyzing network traffic associated with a plurality of network elements; and generating a graphical user interface comprising:
a first plurality of graphical segments representing the plurality of network elements in different categories with different statuses, each of the first plurality of graphical segments (i) being contiguously arranged relative to another of the first plurality of graphical segments in a first graphical structure, (ii) indicating at least one of the categories of the plurality of network elements, (iii) indicating a number of network elements in the at least one of the categories, and (iv) having at least one sub-segment of a plurality of sub-segments, each of the plurality of sub-segments indicating a first grouping of one or more network elements in a same category and having a same status, the plurality of sub-segments representing the different statuses of the plurality of network elements; and
a second plurality of graphical segments representing the plurality of network elements, each of the second plurality of graphical segments (i) being contiguously arranged relative to another of the second plurality of graphical segments in a second graphical structure, and (ii) indicating a second grouping of the one or more network elements in a same geographic location, branch office, network segment, or logical division.

12. The system of claim 11, wherein the same status is ascertained from the network traffic.

13. The system of claim 11,
wherein,
the first graphical structure includes a first ring with an individual graphical representation of each of the different categories,
the second graphical structure includes a second ring with concentric segments contiguously arranged about an axis, and the first ring or the second ring represent security conditions associated with the network elements or geographic locations associated with the network elements.

14. The system of claim 11, wherein each of the plurality of sub-segments is scaled according to a respective number of categories represented such that a first sub-segment representing more categories is larger than a second sub-segment representing fewer categories.

15. The system of claim 11, wherein each of the second plurality of graphical segments is scaled according to a respective number of all categories represented such that a one of the second plurality of graphical segments representing more categories is larger than another of the second plurality of graphical segments representing fewer categories.

16. The system of claim 11,
wherein,
respective ones of each of the first plurality of graphical segments and the second plurality of graphical segments are concentrically arranged relative to each other about an axis, and
each of the plurality of sub-segments are concentrically arranged relative to each other about the axis.

17. A non-transitory computer-readable storage medium having stored therein instructions which, when executed by a processor, cause the processor to perform operations comprising:
analyzing network traffic associated with a plurality of network elements; and
generating a graphical user interface comprising:
a first ring representing the plurality of network elements in different categories with different statuses, the first ring including first segments, each of the first segments (i) contiguously arranged relative to another of the first segments, (ii) indicating at least one of the categories of the plurality of network elements, and (iii) having at least one sub-segment of a plurality of sub-segments, each of the plurality of sub-segments indicating a first grouping of one or more network elements in a same category and having a same status, the plurality of sub-segments representing the different statuses of the plurality of network elements;
a second ring representing the plurality of network elements, the second ring including second segments contiguously arranged within the second ring, each of the second segments (i) contiguously arranged relative to another of the second segments, and (ii) indicating a second grouping of the one or more network elements in a same geographic location, branch office, network segment, or logical division.

18. The non-transitory computer-readable storage medium of claim 17, wherein the same status is ascertained at least in part from the network traffic.

19. The non-transitory computer-readable storage medium of claim 17, wherein each of the segments graphically depicts a security status associated with a set of network elements.

20. The non-transitory computer-readable storage medium of claim 17,
wherein,
respective ones of the first segments and the second segments are concentrically arranged relative to each other about an axis, and
each of the plurality of sub-segments are concentrically arranged relative to each other about the axis.

* * * * *